US012285955B2

(12) United States Patent
Toda et al.

(10) Patent No.: US 12,285,955 B2
(45) Date of Patent: Apr. 29, 2025

(54) LIQUID EJECTION HEAD AND LIQUID EJECTION APPARATUS

(71) Applicant: CANON KABUSHIKI KAISHA, Tokyo (JP)

(72) Inventors: Kyosuke Toda, Kanagawa (JP); Chiaki Muraoka, Saitama (JP); Takeho Miyashita, Kanagawa (JP); Shimpei Yoshikawa, Kanagawa (JP); Yasuaki Kitayama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 58 days.

(21) Appl. No.: 18/198,502

(22) Filed: May 17, 2023

(65) Prior Publication Data

US 2023/0373223 A1 Nov. 23, 2023

(30) Foreign Application Priority Data

May 18, 2022 (JP) ................................ 2022-081586

(51) Int. Cl.
*B41J 2/19* (2006.01)
*B41J 2/175* (2006.01)

(52) U.S. Cl.
CPC ............ *B41J 2/19* (2013.01); *B41J 2/17596* (2013.01); *B41J 2202/12* (2013.01)

(58) Field of Classification Search
CPC ....... B41J 2/18; B41J 2/175; B41J 2/19; B41J 2/17596; B41J 2202/12
See application file for complete search history.

(56) References Cited

U.S. PATENT DOCUMENTS

| | | | | |
|---|---|---|---|---|
| 6,739,706 | B2 | 5/2004 | Barinaga et al. | |
| 8,998,375 | B2 * | 4/2015 | Amma | B41J 2/04 347/85 |
| 11,065,878 | B2 * | 7/2021 | Yamada | B41J 2/175 |
| 2006/0001704 | A1 * | 1/2006 | Anderson | B41J 2/17513 347/65 |

FOREIGN PATENT DOCUMENTS

| | | |
|---|---|---|
| JP | 2003-312006 A | 11/2003 |

* cited by examiner

*Primary Examiner* — An H Do
(74) *Attorney, Agent, or Firm* — Venable LLP

(57) ABSTRACT

A liquid ejection head and a liquid ejection apparatus suppressing the occurrence of an ejection failure without increasing the size of the apparatus are provided. To this end, between a circulation unit and a supply flow path communicating with a pressure chamber, a flow path is provided, having a vertical cross-sectional area in a liquid circulation direction, which is double or more a vertical cross-sectional area in a liquid circulation direction in the supply flow path and having a flow path inner wall inclined with respect to the gravitational direction and whose component force of a normal vector has a component in the gravitational direction.

13 Claims, 27 Drawing Sheets

LIQUID EJECTION HEAD AND LIQUID EJECTION APPARATUS

BACKGROUND OF THE INVENTION

Field of the Invention

The present invention relates to a liquid ejection head and a liquid ejection apparatus.

Description of the Related Art

Japanese Patent Laid-Open No. 2003-312006 has disclosed a liquid ejection head in which a fluid reservoir, a pump, a circulation flow path, and a print head are provided on a carriage, fluid is caused to circulate through the circulation flow path by the pump, and during a printing cycle, fluid is supplied to the print head from the fluid reservoir.

However, the liquid ejection head of Japanese Patent Laid-Open No. 2003-312006 has a separator structure for separating gas from liquid and an air escape area, and therefore, there occurs a concern for an increase in size of the head and ink solidification in the separator structure. Further, air bubbles are guided to the gas/liquid separator structure by inclining the inside of the circulation path, but this circulation path does not pass through the inside of the pressure chamber including a nozzle ejecting fluid in the print head. That is, in the liquid ejection head of Japanese Patent Laid-Open No. 2003-312006, there is no circulation of fluid in the pressure chamber, and therefore, there is a concern that an ejection failure occurs in a case where air bubbles and the like enter the pressure chamber and the like.

SUMMARY OF THE INVENTION

Consequently, the present invention provides a liquid ejection head and a liquid ejection apparatus suppressing the occurrence of an ejection failure without increasing the size of the apparatus.

Consequently, the liquid ejection head of the present invention includes: a printing element substrate having a pressure chamber in which ejection ports are formed and ejecting liquid from the ejection port; a first supply flow path provided on the printing element substrate and communicating with the pressure chamber; a first collection flow path provided on the printing element substrate and communicating with the pressure chamber; a circulation pump causing a pressure difference to occur between the first supply flow path and the first collection flow path so that liquid is supplied from the first supply flow path to the pressure chamber and liquid of the pressure chamber is collected from the first collection flow path; and a second supply flow path connecting the first supply flow path and the circulation pump, wherein the second supply flow path has a vertical cross-sectional area in a liquid circulation direction, which is double or more a vertical cross-sectional area in a liquid circulation direction in the first supply flow path and has a flow path inner wall inclined with respect to the gravitational direction and whose component force of a normal vector has a component in the gravitational direction.

According to the present invention, it is possible to provide a liquid ejection head and a liquid ejection apparatus suppressing the occurrence of an ejection failure without increasing the size of the apparatus.

Further features of the present invention will become apparent from the following description of exemplary embodiments with reference to the attached drawings.

DESCRIPTION OF THE EMBODIMENTS

Figure 1:
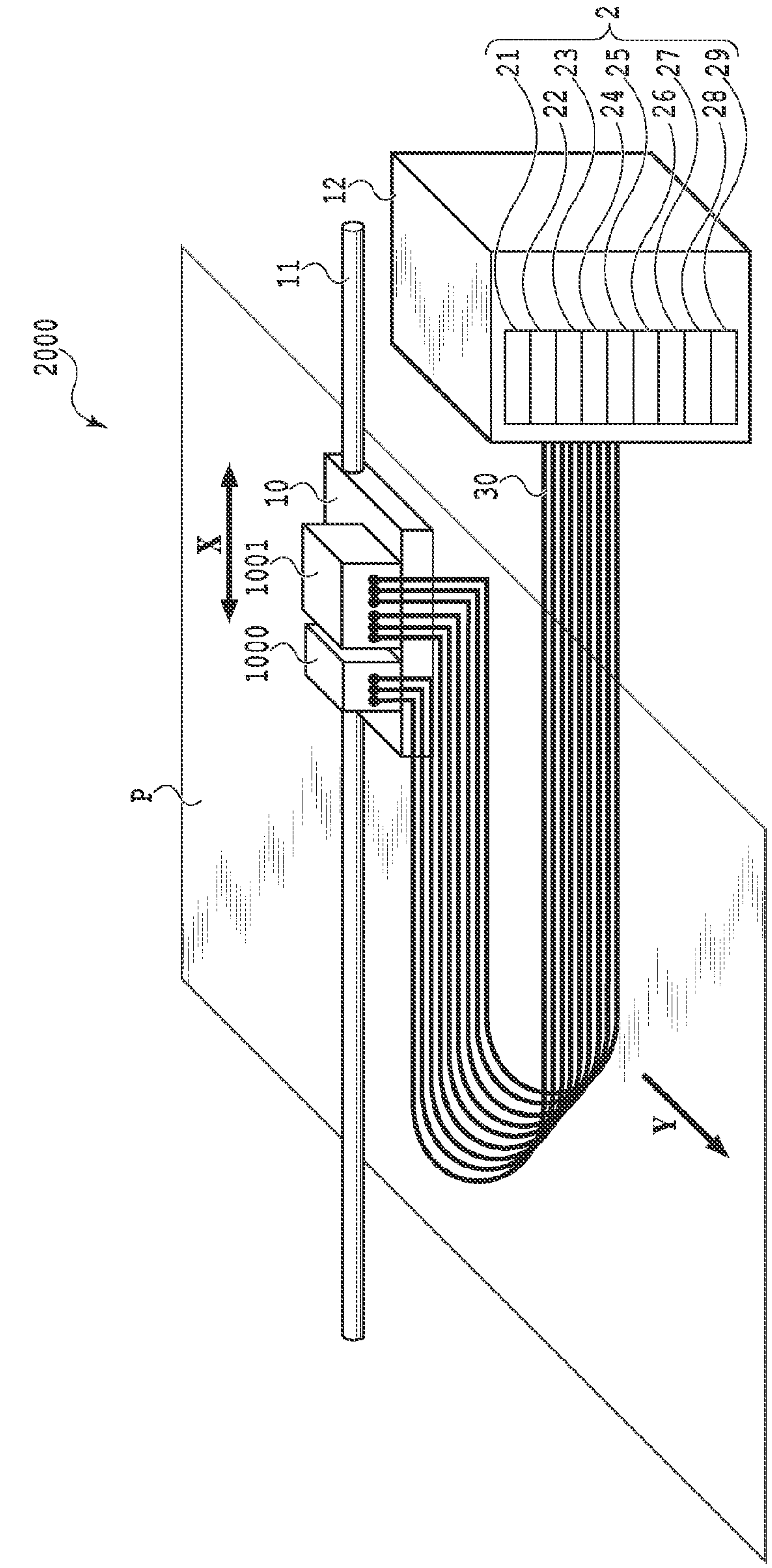
FIG. 1 is a schematic perspective diagram of a liquid ejection apparatus to which a liquid ejection head can be applied.

FIG. 1 is a schematic perspective diagram of a liquid ejection apparatus 2000 to which a liquid ejection head 1000 in the present embodiment can be applied. The liquid ejection apparatus 2000 of the present embodiment is an ink jet printing apparatus employing a serial scan scheme, which prints an image on a printing medium P by ejecting liquid (in the following, also referred to as ink) from the liquid ejection head 1000 and a liquid ejection head 1001. The liquid ejection heads 1000 and 1001 can be mounted on a carriage 10 and the carriage 10 moves in the main scanning direction, an X-direction, along a guide axis 11. The printing medium P is conveyed in the sub scanning direction, a Y-direction, intersecting (in the present embodiment, perpendicular to) the main scanning direction by a conveyance roller, not shown schematically.

On the carriage 10, the two types of liquid ejection head are mounted, and the liquid ejection head 1000 is capable of ejecting three types of ink and the liquid ejection head 1001 is capable of ejecting six types of ink. To each liquid ejection head, ink is supplied under pressure from nine types of ink tank 2 (21, 22, 23, 24, 25, 26, 27, 28, 29) via each ink supply tube 30. On an ink supply unit 12, a supply pump for supply under pressure, to be described later, is mounted.

As a modification example, it is also possible to reduce the number of types of ink tank to seven by setting the three types of ink of the liquid ejection head 1000 to the same type of ink, or configure a liquid ejection apparatus capable of ejecting 12 types or more of ink by further adding a liquid ejection head that is mounted.

The liquid ejection head 1000 is supported fixedly on the carriage 10 by a positioning unit and an electrical contact of the carriage 10 and performs printing by ejecting ink while being moved in the scanning direction, the X-direction.

Figure 2:
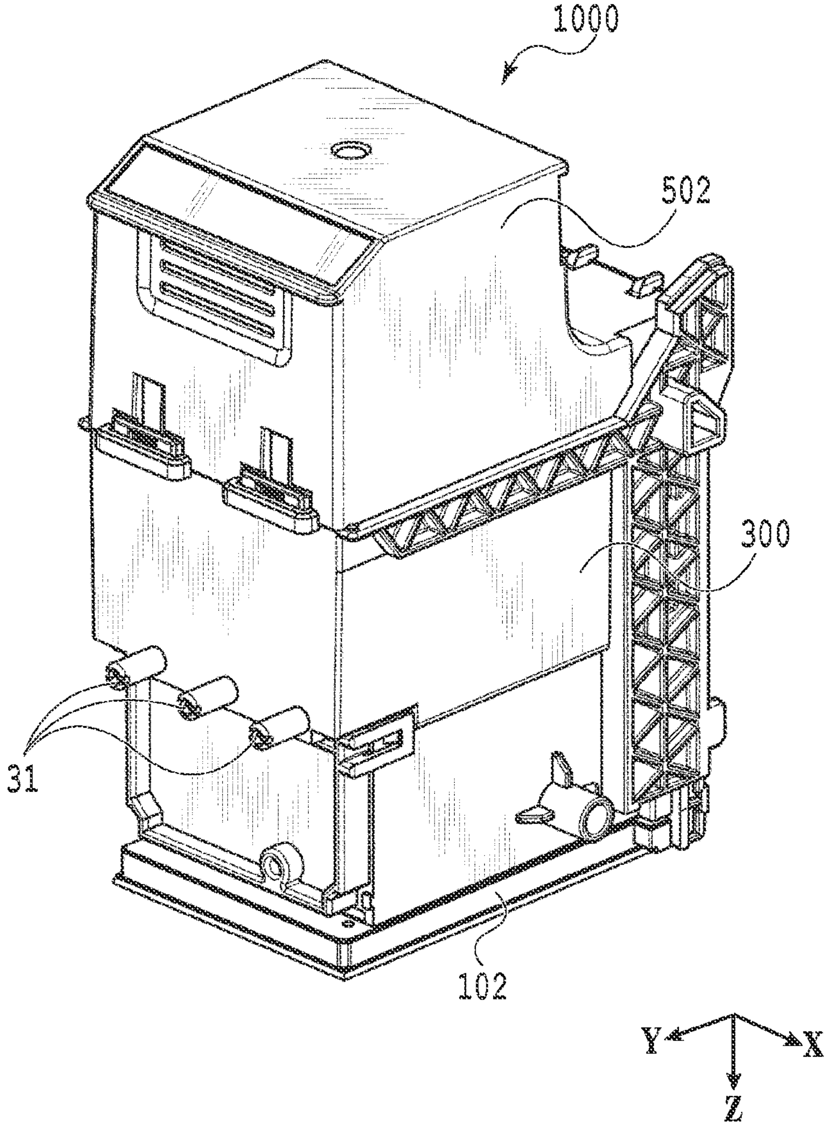
FIG. 2 is a perspective diagram of the liquid ejection head.
Figure 3:
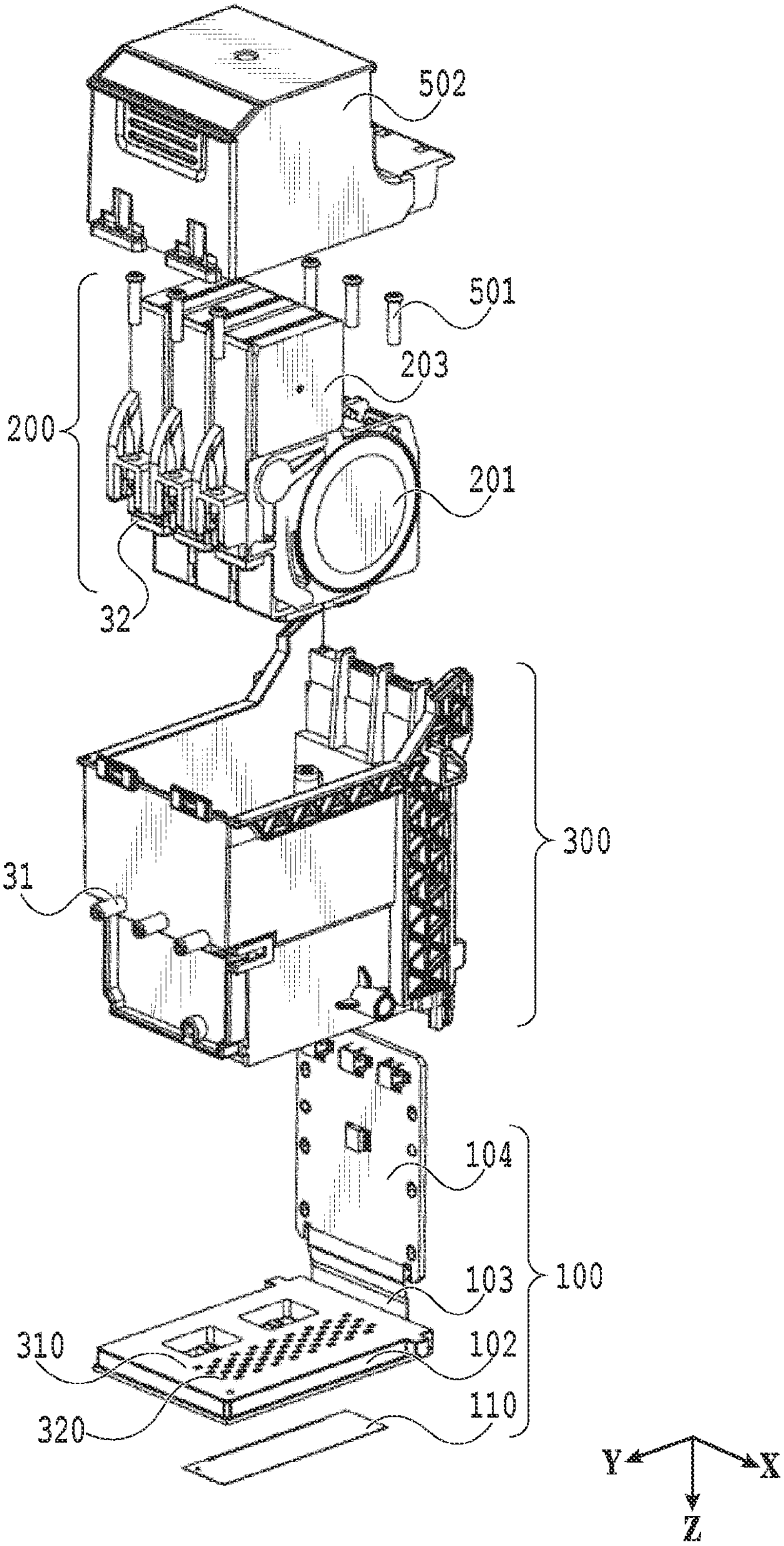
FIG. 3 is an exploded perspective diagram of the liquid ejection head.

FIG. 2 is a perspective diagram of the liquid ejection head 1000 in the present embodiment and FIG. 3 is an exploded perspective diagram of the liquid ejection head 1000. The liquid ejection head 1000 comprises a printing element unit 100, a circulation unit 200, a head casing unit 300, and a cover 502. The printing element unit 100 comprises a printing element substrate 110, a support member 102 having ink supply connection flow paths 310 and 320 to the printing element substrate 110, an electrical wiring tape 103, and an electrical contact substrate 104.

The electrical contact substrate 104 has an electrical contact with the carriage 10 and supplies a drive signal and energy to a circulation pump 203 mounted on the circulation unit 200 via a circulation unit connector 106 and pump wiring, not shown schematically. Further, the electrical contact substrate 104 supplies a drive signal and energy for ink ejection to the printing element unit 100 via the electrical wiring tape 103.

Electrical connection is performed by an anisotropic electrically conductive film (not shown schematically), wire bonding, or solder mounting, but the connection method is not limited to this. In the present embodiment, the connection between the printing element substrate 100 and the electrical wiring tape 103 is performed by wire bonding and the electrical connection portion is sealed with a sealing material and protected against corrosion by ink and external impacts.

The circulation unit 200 comprises a first pressure adjustment mechanism 201, a second pressure adjustment mechanism 202 (see FIG. 4, to be described later), and the circulation pump 203. To an ink supply port 32, through the ink supply tube 30 (see FIG. 1), ink is supplied from the ink tank 2 via the head casing unit 300 having a tube connection unit 31. In the present embodiment, the circulation unit 200 is fixed to the head casing unit 300 with a screw 501 and thereby an ink supply path is configured.

As the seal member that is used at the connection portion in the ink supply path, an elastic member, such as rubber and elastomer, is employed. The printing element unit 100 is caused to adhere and be fixed to the head casing unit 300 and forms the ink supply path. It may also be possible to use an elastic body at the connection portion in the ink supply path. The head casing unit 300 is configured by combining parts obtained by injection molding a filler-contained resin for positioning with the carriage 10 and for forming an ink flow path shape.

On the printing element substrate 110, an ejection port column in which a plurality of ejection ports is arrayed in the Y-direction is formed. A plurality of ejection port columns is provided in the X-direction.

Figure 4:
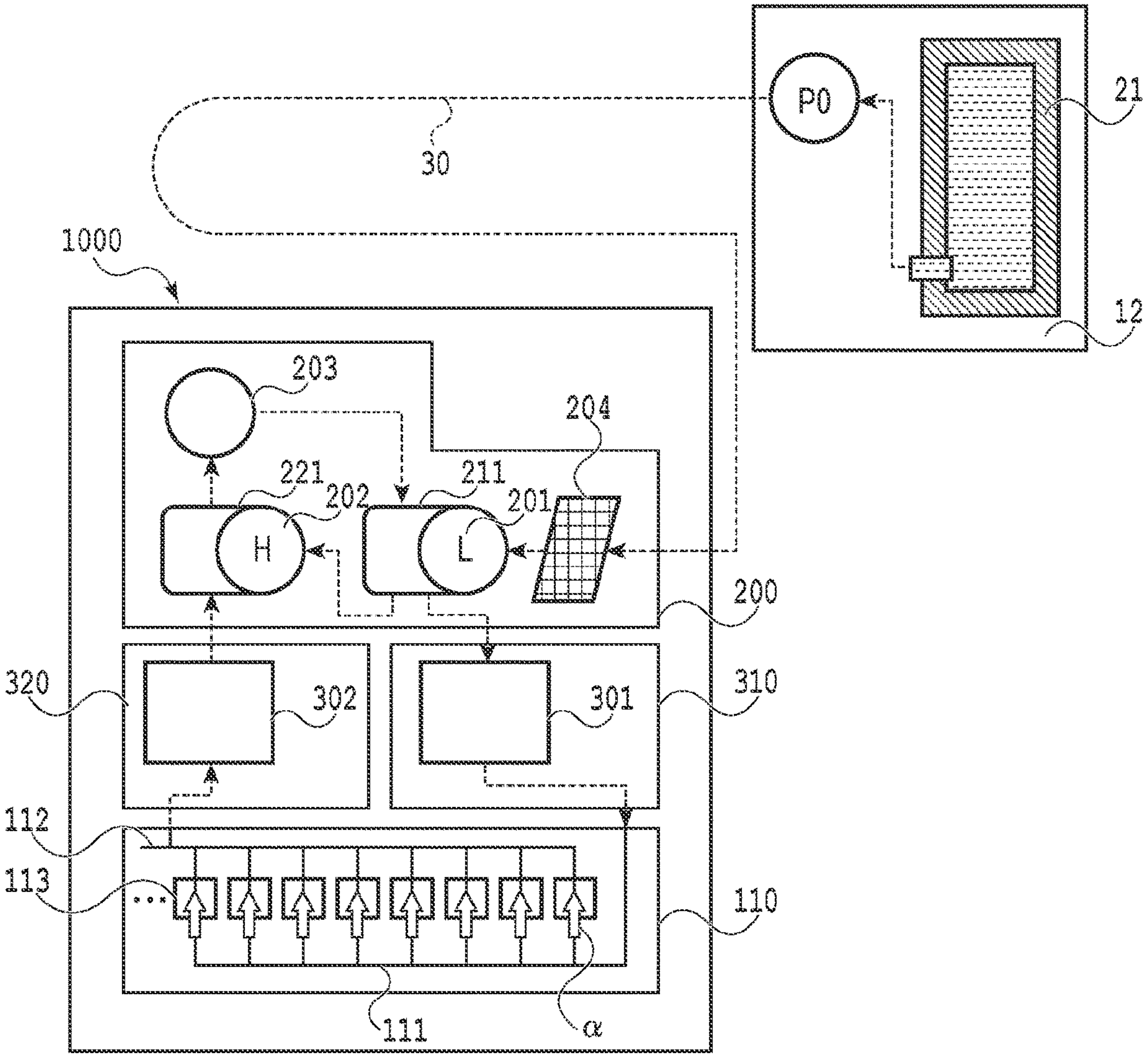
FIG. 4 is a schematic diagram showing a circulation path in a constant state of ink of one color.

FIG. 4 is a schematic diagram showing a circulation path in the constant state of ink of one color, which is applied to the liquid ejection apparatus 2000 of the present embodiment. From the ink tank 21 up to the liquid ejection head 1000, ink is supplied under pressure by a supply pump P0. The ink is supplied to the first pressure adjustment mechanism 201 after dust or the like is removed by a filter 204

In FIG. 4 (also in FIG. 6, to be described later), "L" is described in the first pressure adjustment mechanism 201 and "H" is described in the second pressure adjustment mechanism 202. This indicates "H" corresponding to high negative pressure and "L" corresponding to low negative pressure and this is opposite to those in a case where the positive pressure is taken as a reference and H and L are exchanged. By the first pressure adjustment mechanism 201, the pressure within a first pressure control chamber 211 is adjusted to a predetermined pressure (negative pressure). The circulation pump 203 is a piezoelectric diaphragm pump that sends liquid by inputting a drive voltage to a piezoelectric element pasted onto the diaphragm to change the inner volume within the pump chamber and alternately move two check valves due to the pressure variation.

The circulation pump 203 sends ink from a second pressure control chamber 221 on the low pressure (negative pressure is high) side to the first pressure control chamber 211 on the high pressure (negative pressure is low) side. The pressure within the second pressure control chamber 221 is adjusted to a pressure lower than that within the first pressure control chamber 211 by the second pressure adjustment mechanism 202. On the printing element substrate 110, a plurality of pressure chambers 113 having an ejection port capable of ejecting liquid is arranged and to each pressure chamber 113, a common supply flow path 111 and a common collection flow path 112 are connected.

The common supply flow path 111 is connected to the first ink connection flow path 310 and to the first pressure control chamber 211 via a first air bubble storage flow path (air bubble reservoir portion) 301, and therefore, its pressure is adjusted to a high pressure (upstream) side. The common collection flow path 112 is connected to the second ink connection flow path 320 and to the second pressure control chamber 221 via a second air bubble storage flow path 302, and therefore, its pressure is adjusted to a low pressure (downstream) side. By the pressure difference between the common supply flow path 111 and the common collection flow path 112, in each pressure chamber 113, a flow occurs in the direction of an arrow a in FIG. 4. By the ink flow due to the pressure difference such as this, the ink having thickened locally in the vicinity of the ejection port in the standby state or from which no ink is ejected during printing is collected from the pressure chamber 113, and therefore, it is possible to suppress an ejection failure.

In the present embodiment, the first air bubble storage flow path 301 and the second air bubble storage flow path 302 each have an inner volume capable of temporarily storing air bubbles within the ink path, which have occurred during printing and standby.

Figure 5A:
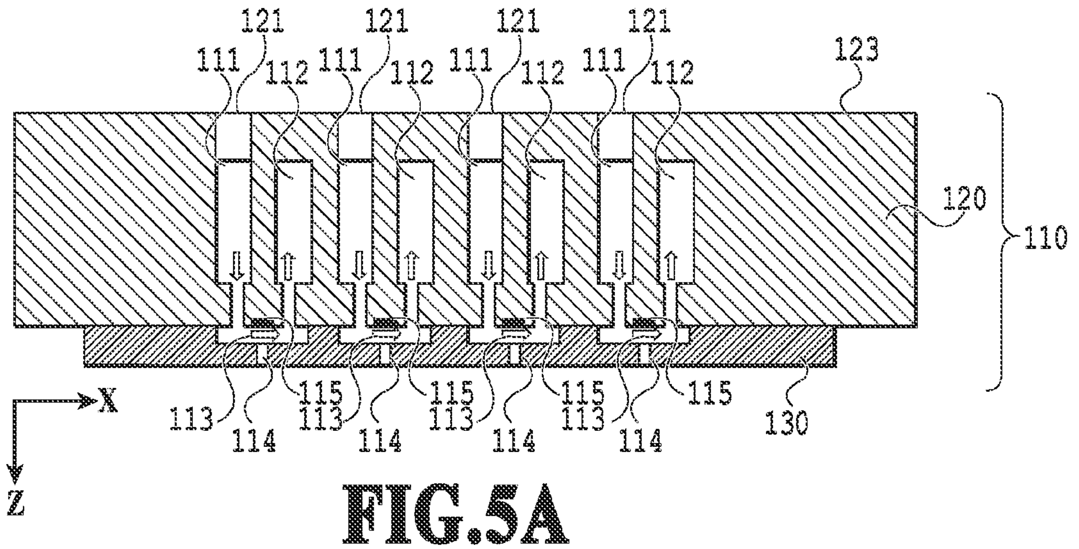
FIG. 5A is a cross-sectional diagram at a different position in a Y-direction on a printing element substrate.
Figure 5B:
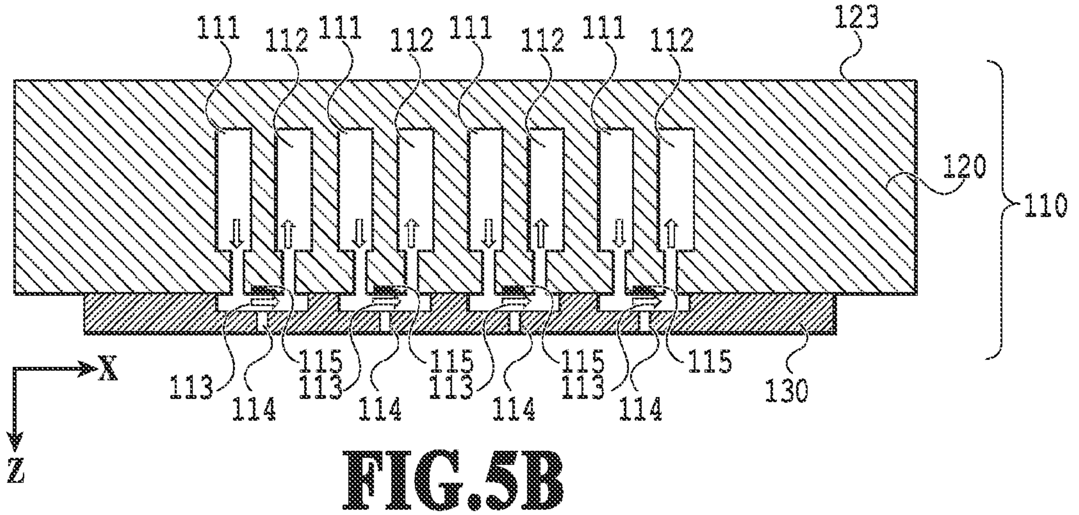
FIG. 5B is a cross-sectional diagram at a different position in the Y-direction on the printing element substrate.
Figure 5C:
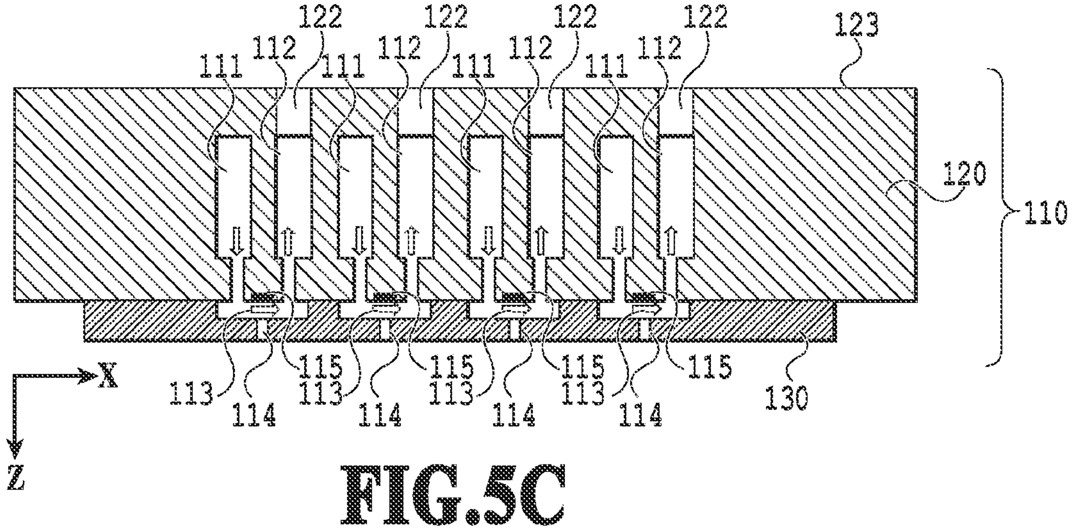
FIG. 5C is a cross-sectional diagram at a different position in the Y-direction on the printing element substrate.

FIG. 5A to FIG. 5C are each a cross-sectional diagram at a different position in the Y-direction on the printing element substrate 110. The printing element substrate 110 comprises a Si substrate 120 on which an electric circuit, not shown schematically, and a heater 115, which is a pressure generation mechanism, are arranged, and an ejection port member 130 obtained by lithography-patterning the pressure chamber 113 corresponding to the heater 115 and an ejection port 114. In the present embodiment, ejection energy is obtained by applying a voltage to the heater 115 and causing the ink within the pressure chamber 113 to foam, but the pressure generation mechanism is not limited to this. It may also be possible to use a piezoelectric element in place of the heater. The Si substrate 120 comprises a connection surface 123 and the connection surface 123 is caused to adhere and be fixed to the support member 102 and connected to each ink supply path.

In the present embodiment, in order to improve suppliability of ink to the pressure chamber 113 and reduce costs by downsizing the substrate, the common supply flow path 111 and the common collection flow path 112 are configured at a pitch whose distance in the X-direction is 1 mm or less. Further, in view of the printing efficiency onto the printing medium P, four ejection port columns in which ejection ports are arrayed with 600 dpi are arranged. The resolution of the ejection port arrangement and the number of ejection port columns are not limited to those.

FIG. 5A shows a cross section of a common supply flow path opening 121 at the position at which the common supply flow path 111 communicates with the connection surface 123. FIG. 5B shows a cross section at the position at which neither of the common supply flow path 111 and the common collection flow path 112 communicates with the connection surface 123. FIG. 5C shows a cross section of a common collection flow path opening 122 at the position at which the common collection flow path 112 communicates with the connection surface 123.

In order to control the pressure difference between the common supply flow path 111 and the common collection flow path 112, it is necessary to divide the ink supply path other than the pressure chamber 113 and the pressure adjustment mechanism unit.

Because of this, at the position of the cross section shown in FIG. 5B, the first ink connection flow path 310 and the second ink connection flow path 320 are divided in the direction of the ejection port column. The common supply flow path 111 and the common collection flow path 112 each have a very small cross-sectional area and there is a concern that the ink supply runs short due to the pressure loss caused by liquid sending. Because of this, it is desirable to shorten the common supply flow path 111 and the common collection flow path 112 that do not communicate with the connection surface 123 shown in FIG. 5B as much as possible. Consequently, it is desirable to provide a large number of common supply flow path openings 121 shown in FIG. 5A and a large number of common collection flow path openings 122 shown in FIG. 5C in the direction of the ejection port column.

In the exploded perspective diagram in FIG. 3, the first ink connection flow path 310 is arranged at nine portions and the second ink connection flow path 320 is arranged at eight portions per color. The number of connection portions differs depending on the length of the ejection port column and the width in a case w % here the divided ink supply paths are joined. In the present embodiment, the cross-sectional area of the common supply flow path 111 and the common collection flow path 112 in FIG. 5B is 0.1 $mm^2$ or less and the distance between the common supply flow path opening 121 and the common collection flow path opening 122 is 7.5 mm or less.

Figure 6:
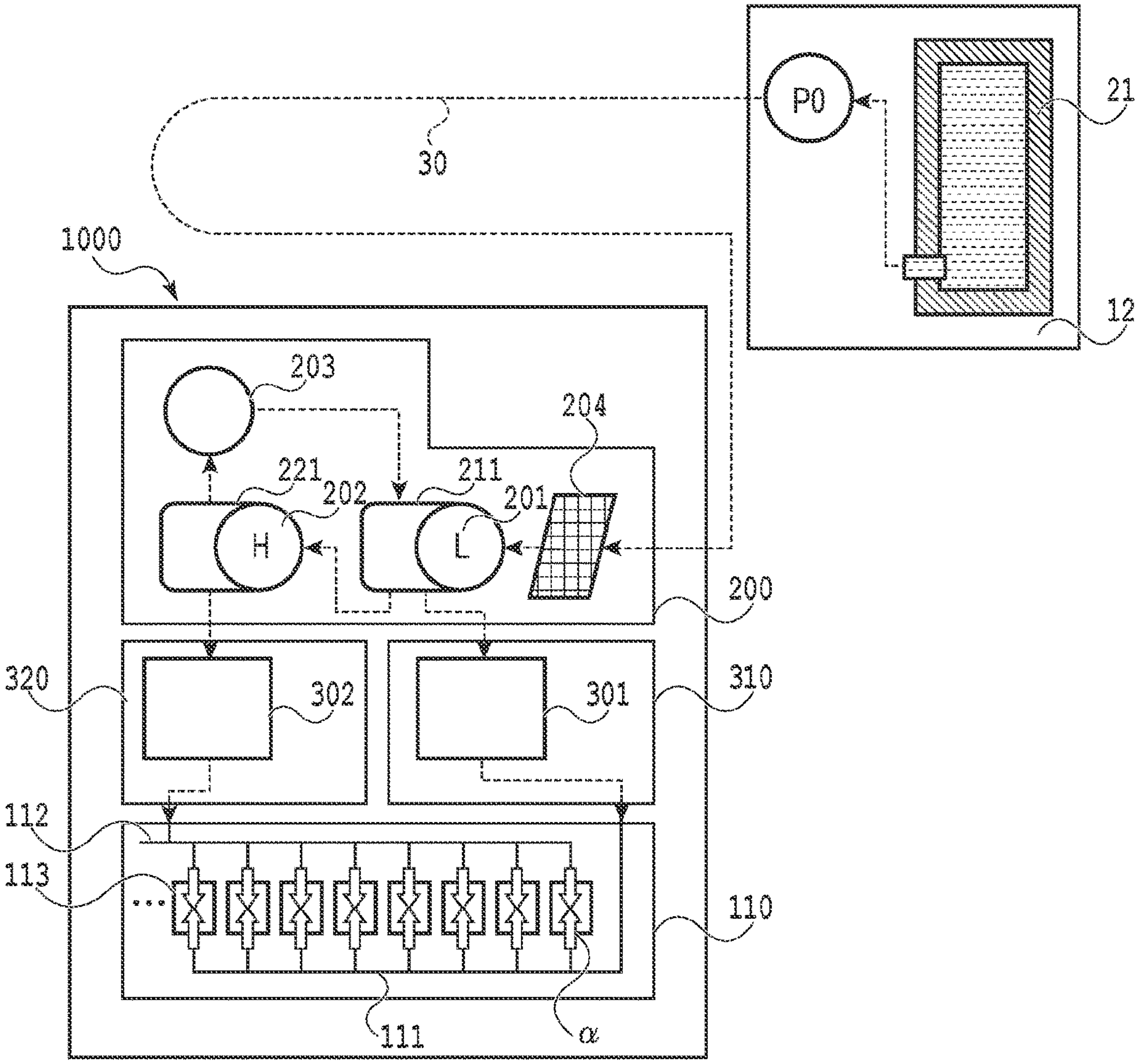
FIG. 6 shows an ink flow in a case where printing is performed by using the majority of ejection ports.

FIG. 6 shows an ink flow in the circulation path for one color in a case where printing is performed by using the majority of the ejection ports in the present embodiment. In a case where printing is performed by using the majority of the ejection ports, the way ink flows is different from the circulation in the constant state and ink is supplied to the pressure chamber 113 from both the common supply flow path 11 and the common collection flow path 112.

In a case where ink is ejected from the pressure chamber 113, ink is supplied from the common supply flow path 111 and the common collection flow path 112, respectively. The common supply flow path 111 supplies the ink to the pressure chamber 113, which is supplied from the first ink connection flow path 310 and from the first pressure control chamber 211 via the first air bubble storage flow path 301. Further, the common collection flow path 112 supplies the ink to the pressure chamber 113, which is supplied from the second ink connection flow path 320 and from the second pressure control chamber 221 via the second air bubble storage flow path 302. The circulation pump 203 transports ink from the second pressure control chamber 221 to the first pressure control chamber 211 as in the constant state.

At this time, the second pressure control chamber 221 supplies ink to the second ink connection flow path 320 and the circulation pump 203. Further, the second pressure control chamber 221 keeps the pressure constant by ink being supplied from the first pressure control chamber 211 via a bypass flow path connecting the first pressure adjustment mechanism 201 and the second pressure adjustment mechanism 202 by the second pressure adjustment mechanism 202. The first pressure control chamber 211 supplies ink to the second pressure adjustment mechanism 202 and the first ink connection flow path 310, but keeps the pressure constant by collecting ink from the ink tank 21, which is the ink supply source, by the first pressure control mechanism 20, including the ink transported by the circulation pump 203.

As described above, depending on the printing state, the ink flow direction in the common collection flow path 112 changes and accompanying this, the ink flow direction in the second ink connection flow path 320 and the second air bubble storage flow path 302 changes.

Figure 7:
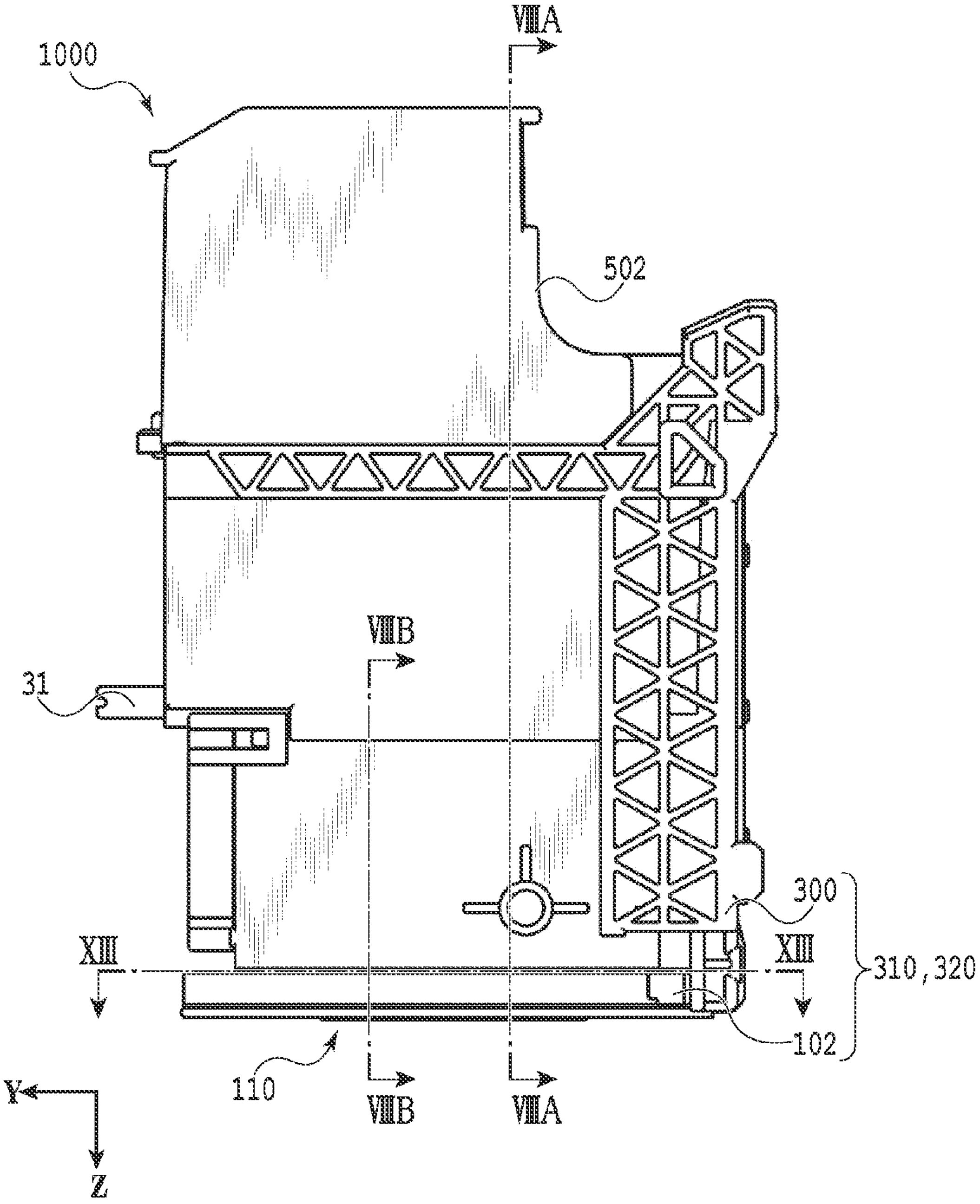
FIG. 7 is a side diagram showing the liquid ejection head.
Figure 8B:
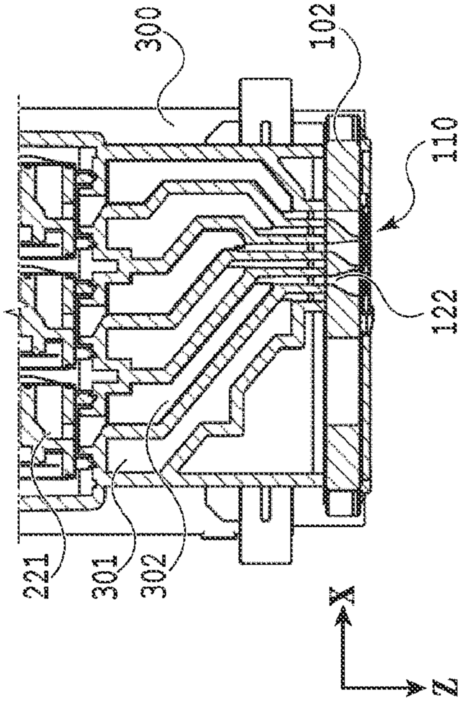
FIG. 8B is a cross-sectional diagram showing the liquid ejection head.
Figure 8A:
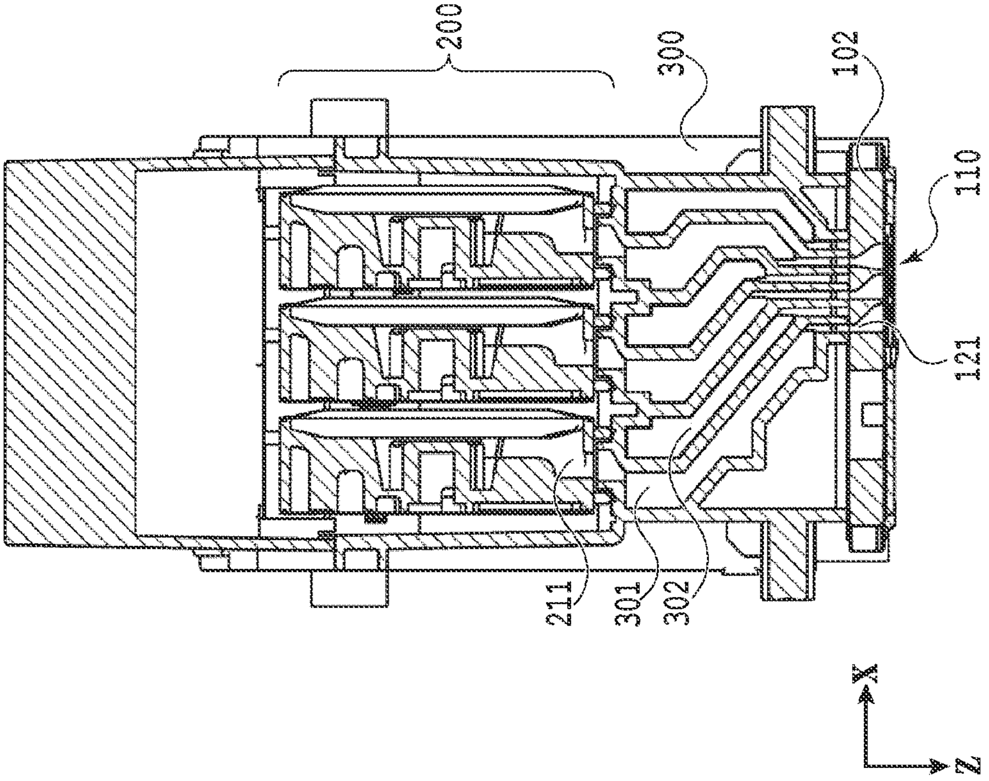
FIG. 8A is a cross-sectional diagram showing the liquid ejection head.

FIG. 7 is aside diagram showing the liquid ejection head 1000, FIG. 8A is a cross-sectional diagram along VIIIA-VIIIA in FIG. 7, and FIG. 8B is a cross-sectional diagram along VIIIB-VIIIB in FIG. 7. On the printing element substrate 110, the ejection port column is provided along the Y-direction, the movement direction of the printing medium P, and from each ejection port, ink is ejected in the Z-direction. The first ink connection flow path 310 and the second ink connection flow path 320 include the head casing unit 300 and the support member 102.

The printing element substrate 110 is supported by the support member 102 and supported so as to be connected to the common supply flow path opening 121 and the common supply flow path 111 from the first pressure control chamber 211 via the first air bubble storage flow path 301 and the first ink connection flow path 310. Further, the printing element substrate 110 is supported so as to be connected to the common collection flow path opening 122 and the common collection flow path 112 from the second pressure control chamber 221 via the second air bubble storage flow path 302 and the second ink connection flow path 320.

The pressure within the first pressure control chamber 211 and the second pressure control chamber 221 is controlled to be constant by the pressure adjustment mechanism configured within the circulation unit 200.

Figure 9:
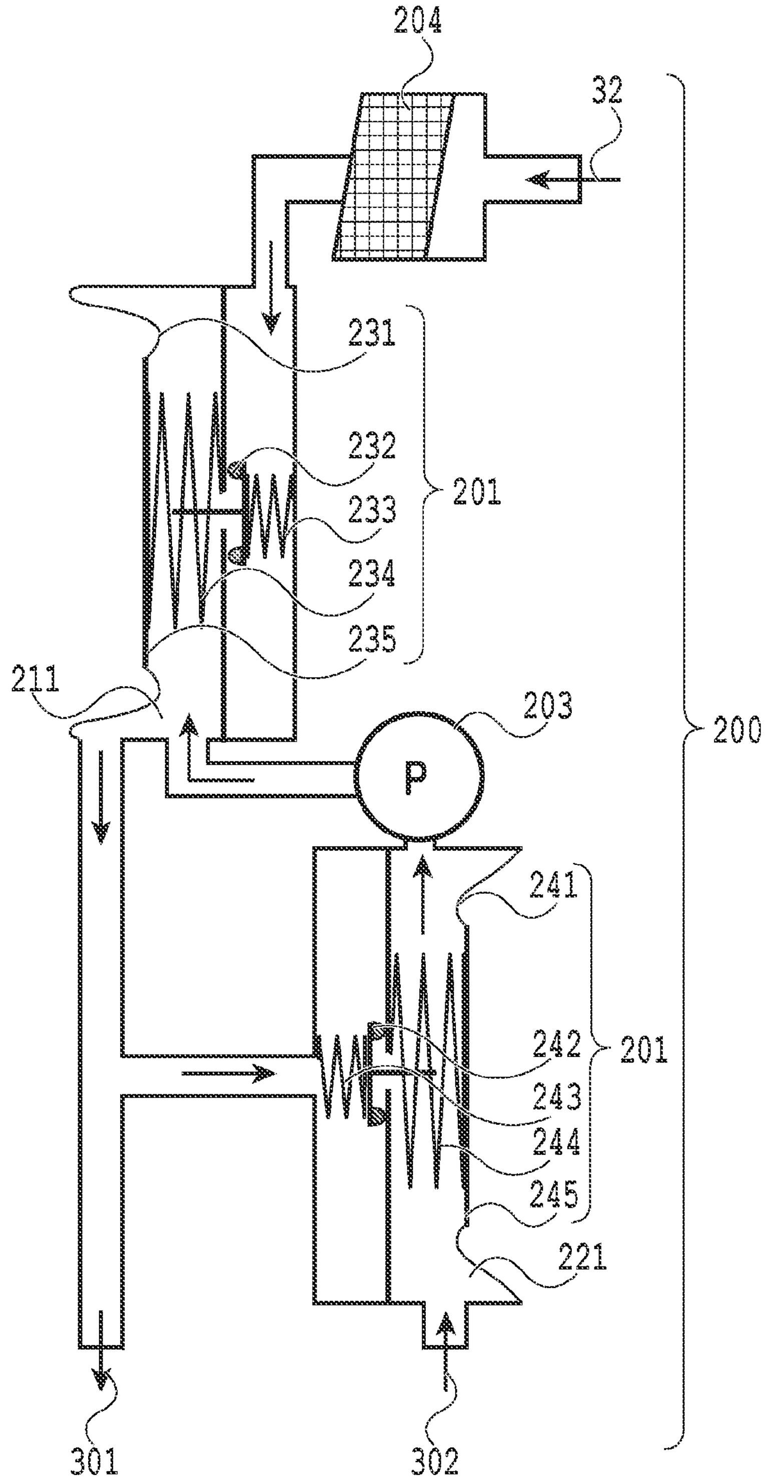
FIG. 9 is a schematic diagram showing the inside of a circulation unit in an understandable manner.

FIG. 9 is a schematic diagram showing the inside of the circulation unit 200 in an understandable manner. In the circulation unit 200, from the ink supply unit 12, ink is supplied under pressure to the first pressure adjustment mechanism 201 via the filter 204 through the ink supply port 32. The first pressure adjustment mechanism 201 comprises a valve 232, a valve spring 233, a flexible member 231, a pressing plate 235, and a pressure adjustment spring 234.

In the first pressure control chamber 211, in a case where the volume of the first pressure control chamber 211 decreases due to the discharge of ink, the pressing plate 235 deforms the flexible member 231 and the pressure adjustment spring 234 and makes an attempt to keep constant the pressure within the first pressure control chamber 211. By the pressure adjustment spring 234 compressing and deforming, it is possible to open the valve 232 and supply ink to the first pressure control chamber 211 by deforming the valve spring 233 in the direction of compression via the valve 232. By this operation, it is made possible to keep constant the supply of ink and the pressure within the first pressure control chamber 211. The negative pressure in the first pressure control chamber 211 is set by the position of contact between the pressure adjustment spring 234 and the pressing plate 235 of the valve 232.

The second pressure adjustment mechanism 202 of the second pressure control chamber 221 comprises a valve 242, a valve spring 243, a flexible member 241, a pressing plate 245, and a pressure adjustment spring 244. The pressure adjustment principle in the second pressure adjustment mechanism 202 is the same as the principle in the first pressure adjustment mechanism 201 except in that the ink supply source changes from the ink supply unit 12 to the first pressure control chamber 211.

The circulation pump 203 is connected so as to send ink within the second pressure control chamber 221 to the first pressure control chamber 211. In the present embodiment, as the circulation pump 203, a compact diaphragm pump including a piezoelectric element is employed. It is possible to drive the pump by applying a voltage pulse to the piezoelectric element, and therefore, it is possible to control ON/OFF of the circulation pump 203 by the input voltage pulse. By the circulation pump 203 moving the ink in the second pressure control chamber 221 to the first pressure control chamber 211, the pressure within the first pressure control chamber 211 increases by the amount corresponding to the sent ink and the pressure within the second pressure control chamber 221 decreases by the amount corresponding to the sent ink.

The second pressure control chamber 221 collects ink corresponding to the amount having decreased the pressure via the second pressure adjustment mechanism 202, but the second pressure adjustment mechanism 202 collects ink from the first pressure control chamber 211 and the pressure chamber 113, and therefore, a circulation flow occurs with the pressure being kept constant. By the circulation flow via the pressure chamber 113 occurring as described above, it is made possible to remove ink having thickened due to evaporation of ink in the vicinity of the ejection port, and therefore, stable ejection is enabled.

Figure 10A:
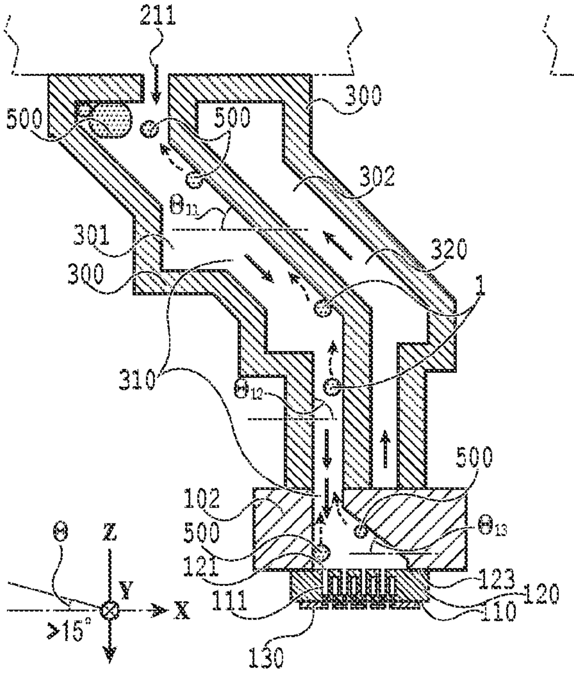
FIG. 10A is a cross-sectional diagram showing a first ink connection flow path and a second ink connection flow path.
Figure 10B:
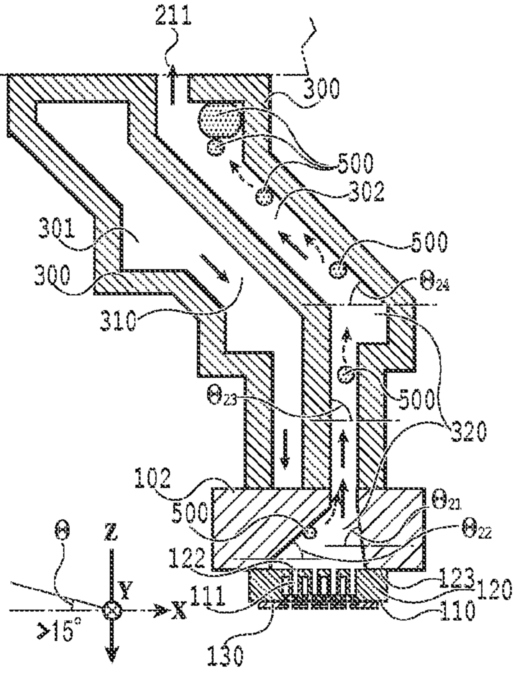
FIG. 10B is a cross-sectional diagram showing the first ink connection flow path and the second ink connection flow path.
Figure 10C:
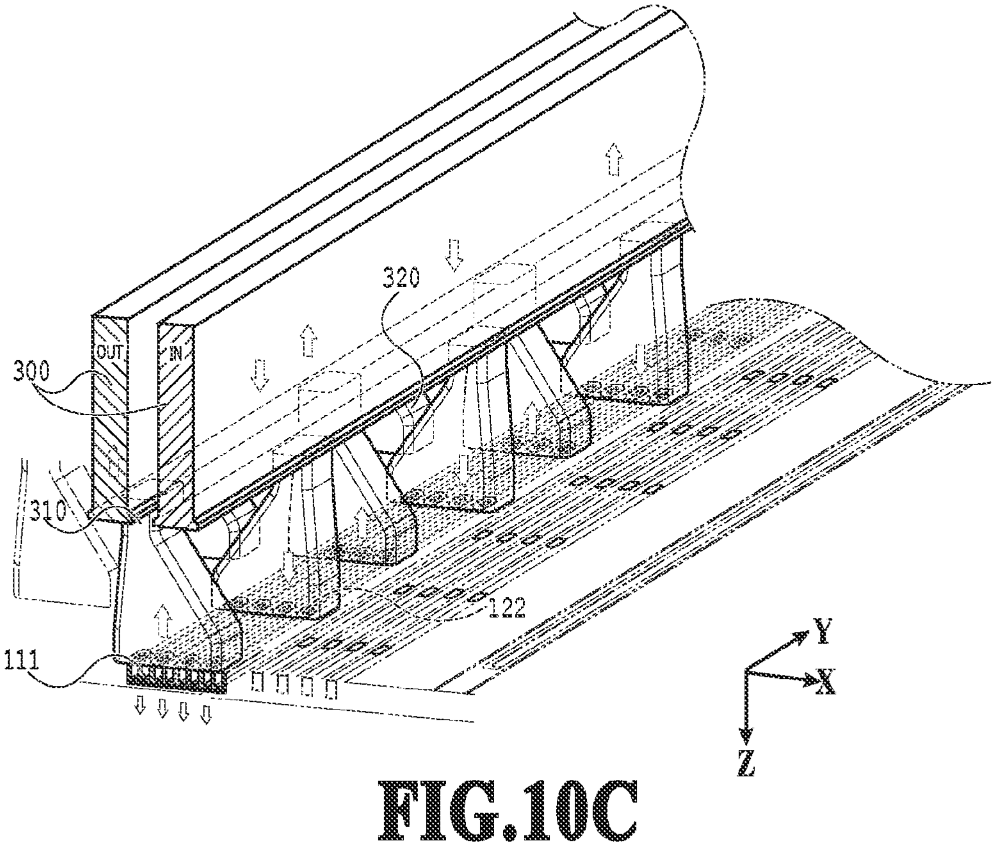
FIG. 10C is a cross-sectional diagram showing the first ink connection flow path and the second ink connection flow path.

FIG. 10A is a cross-sectional diagram showing the first ink connection flow path 310 that is connected with the first pressure control chamber 211 in the present embodiment and FIG. 10B is a cross-sectional diagram showing the second ink connection flow path 320 that is connected with the second pressure control chamber 221. Further, FIG. 10C is a perspective diagram showing a flow path in the connection portion between the head casing unit 300 and the support member 102 in an understandable manner. The printing element substrate 110 comprises the ejection port member 130 and the Si substrate 120. On the Si substrate 120, a warming heater, not shown schematically, for stabilizing ejection is arranged. Further, for temperature equalizing of the entire printing element substrate 110 and for joint stability with the Si substrate 120, the support member 102 employs an alumina material whose linear expansion is similar to that of Si and whose thermal conductivity is high.

In FIG. 10A and FIG. 10B, the arrow (solid line) shown within the flow path indicates the flow of the circulation ink by the drive of the circulation pump 203 at the time at which printing is not performed. Specifically, in FIG. 10A, ink flows from the first pressure control chamber 211 to the common supply flow path opening 121 via the head casing unit 300 configuring the first air bubble storage flow path 301 and the support member 102 configuring part of the first ink connection flow path 310. This ink flows from the common supply flow path 111 to the common collection flow path 112 through the pressure chamber 113, from which ink is ejected, and is collected in the common collection flow path opening 122. The head casing unit 300 configuring the second air bubble storage flow path 302 and the second ink connection flow path 320 comprising the support member 102 supply the ink collected in the common collection flow path opening 122 to the second pressure control chamber 221. By the circulation pump 203 sending ink from the second pressure control chamber 221 to the first pressure control chamber 211, one cycle of the circulation flow is completed.

The circulation flow is completed within the ink flow path of the liquid ejection head 1000, and therefore, air bubbles 500 that occur within the flow path of the liquid ejection head 1000 exist somewhere in the circulation flow. The air bubbles 500 occur at the time of ink filling, or are caused by foaming due to ink flow or the like, oversaturation of dissolved gas of ink resulting from a rise in temperature and a decrease in pressure within the liquid ejection head 1000, or the like. In a case where the air bubbles 500 flow into the pressure chamber 113, there is a possibility that an ink ejection failure occurs, resulting in an image defect. Because of this, it is desirable to store the air bubbles 500 in the circulation flow path distant from the pressure chamber 113 in order to prevent the air bubbles 500 from flowing into the pressure chamber 113.

In a case of a general liquid ejection head having no flow path for storing air bubbles, it is necessary to use the liquid ejection head within a range in which the dissolved gas does not become oversaturated by controlling the degree of deaeration of ink or discharge generated air bubbles to the outside of the head each time air bubbles occur. As the method of controlling the degree of deaeration, there exist decreased pressure stirring, a deaeration module using a hollow fiber membrane and the like, but they raise costs and increase the head size and weight, and therefore, there is a possibility that the printing speed or the like is affected. Further, in a case where ink including air bubbles is discharged each time air bubbles occur, the ink to be used for printing is used as waste ink, and therefore, there is a concern that the printing cost is affected.

Consequently, in the present embodiment, by inclining the ceiling of the first air bubble storage flow path 301 and the second air bubble storage flow path 302, the air bubbles 500 having occurred in the air bubble storage flow path are guided by the buoyant force to a position distant from the pressure chamber 113 within the circulation flow path and at the same time the air bubbles 500 are stored temporarily at the distant position. Here, the ceiling refers to a flow path inner wall that is a surface forming part of the flow path and whose component force of the normal vector to the ceiling surface has a component in the gravitational direction. Most of air bubbles that occur due to a change in environment, such as a rise in temperature, are minute bubbles whose diameter is 1 mm or less, and therefore, it is necessary to increase the buoyant force against the drag that occurs in the air bubbles 500 due to the ink flow.

In the present embodiment, in order to prevent the ink in the vicinity of the ejection port from thickening, the circulation flow is caused to occur also while printing is not performed. Because of this, in the first ink connection flow path 310 and the first air bubble storage flow path 301, the ink flow toward the printing element substrate 110 occurs, and therefore, it is difficult to guide the air bubbles 500 to a position distant from the pressure chamber 113. The drag that is caused by the ink flow is in proportion to the square of ink flow velocity, and therefore, it is effective to reduce the ink flow velocity in order to reduce the drag. By reducing the ink flow velocity to reduce the drag, it is made easier to guide the air bubbles 500 by the buoyant force to a position distant from the pressure chamber 113.

Further, in the present embodiment, the minimum vertical cross-sectional area in the ink circulation direction of the first air bubble storage flow path 301 is 20 times or more the minimum vertical cross-sectional area in the ink circulation direction of the first ink connection flow path 310. As shown in FIG. 1C, the head casing unit 300 configuring the first air bubble storage flow path 301 extends in the Y-direction, and therefore, the first air bubble storage flow path 301 also extends in the Y-direction. The configuration is designed so that the minimum cross-sectional area of the first air bubble storage flow path 301 is 20 times or more the minimum cross-sectional area of the first ink connection flow path 310 in the structure of the flow path such as this. Even in a case where the minimum cross-sectional area of the first air bubble storage flow path 301 is double or more the minimum cross-sectional area of the first ink connection flow path 310, it is possible to obtain the effect that is explained in the present embodiment. Further, the first ink connection flow path 310 at the connection portion between the head casing unit 300 and the support member 102 is provided at nine portions along the Y-direction. Consequently, it is made possible to reduce the ink flow velocity to 9/20=0.45. In the present embodiment, the ceiling surfaces of the first air bubble storage flow path 301 and the first ink connection flow path 310 each have an angle of about 40 degrees to 50 degrees (θ11, θ13) with respect to the surface on which the ejection port is arranged.

As described above, by configuring the flow path cross-sectional area so that the maximum flow velocity in the first air bubble storage flow path 301 is less than the maximum flow velocity in the first ink connection flow path 310, the drag that is caused by the ink flow against the air bubbles 500 is reduced. Due to this, it is made possible to guide the air bubbles 500 having left the first ink connection flow path 310 up to the top end of the ceiling of the first air bubble storage flow path 301. Due to the configuration such as this, by reducing the flow velocity of the ink circulation flow in the first air bubble storage flow path 301 sufficiently lower than the flow velocity of the ink circulation flow in the first ink connection flow path 310 or by temporarily stopping the flow, it is possible to guide the air bubbles 500 to a position distant from the pressure chamber 113. This angle θ is determined by the coefficient of friction determined by the physical properties of ink and the inner wall of the first ink connection flow path 310, and the locomotive force by the buoyant force.

For the ink used in the liquid ejection head 1000 in the present embodiment and the member of the first ink connection flow path 310, it has been checked that the effect of the present embodiment is obtained by the ceiling surface having an angle of about 15 degrees or more with respect to the surface on which the ejection port is arranged. More preferably, it is desirable to set the ceiling surface so as to have an angle close to 90 degrees at which it is possible to use 100% of the component force of the buoyant force of the air bubbles 500 for the locomotive force.

Further, in the present embodiment, the flow path minimum cross-sectional area of the first ink connection flow path 310 is secured so as to be double or more the total flow path cross-section area (total area) of the common supply flow path opening 121 that is connected. Due to this, the ink flow velocity in the flow path minimum cross-section area portion of the first ink connection flow path 310 becomes less than the ink flow velocity in the vicinity of the common supply flow path opening 121, and therefore, the air bubbles 500 become hard to be pulled into the common supply flow path 111.

With the setting that the constant ink circulation flow has velocity of a certain level, there is a case where the air bubbles 500 stay within the first ink connection flow path 310 depending on the volume of the air bubbles 500. In the case such as this also, provided that it is possible to discharge the air bubbles 500 to the side of the first air bubble storage flow path 301 by setting a brief time during which the ink circulation flow is stopped, it is made possible to guide the air bubbles 500 up to the ceiling side of the first air bubble storage flow path 301 even though the ink circulation is started again. It is not possible to set the circulation stop time during printing, and therefore, it is desirable to complete the discharge of the air bubbles 500 in a brief time in order to prevent the productivity from decreasing.

In the present embodiment, also in the inner walls of the second air bubble storage flow path 302 and the second ink connection flow path 320 (see FIG. 10B), the ceiling surfaces each have an angle of about 40 degrees to 50 degrees (θ22, θ24) with respect to the surface on which the ejection port is arranged. Due to this, it is possible to complete the movement of the air bubbles 500 to the second air bubble storage flow path 302 in a brief time by the circulation flow dynamic pressure, in addition to the locomotive force by the buoyant force.

Figure 11A:
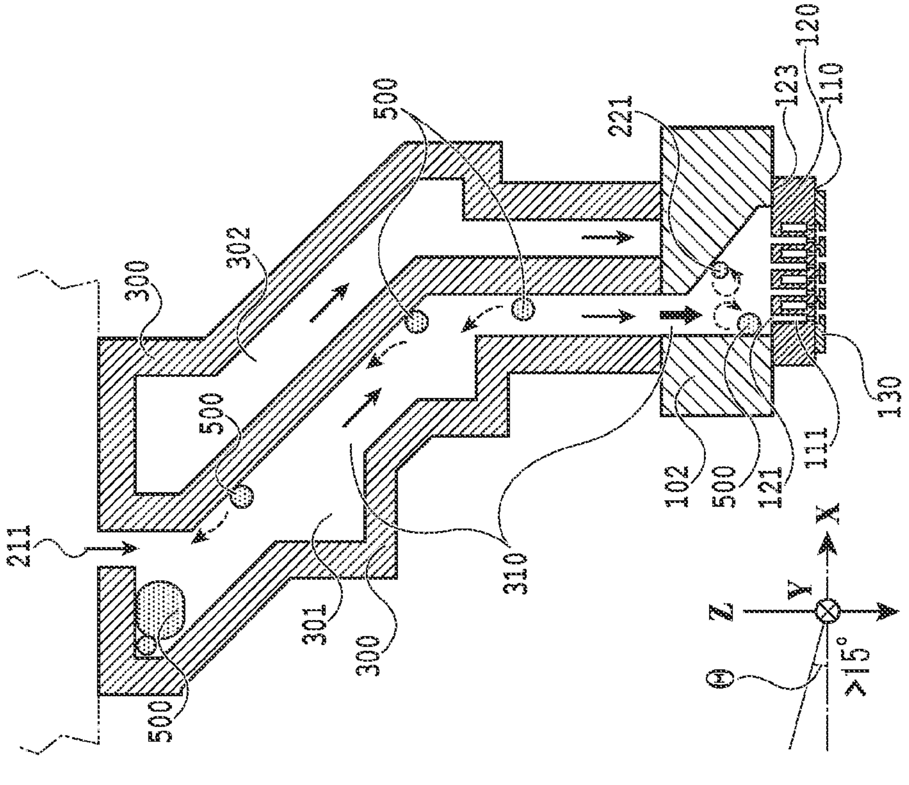
FIG. 11A is a cross-sectional diagram showing the first ink connection flow path and the second ink connection flow path.
Figure 11B:
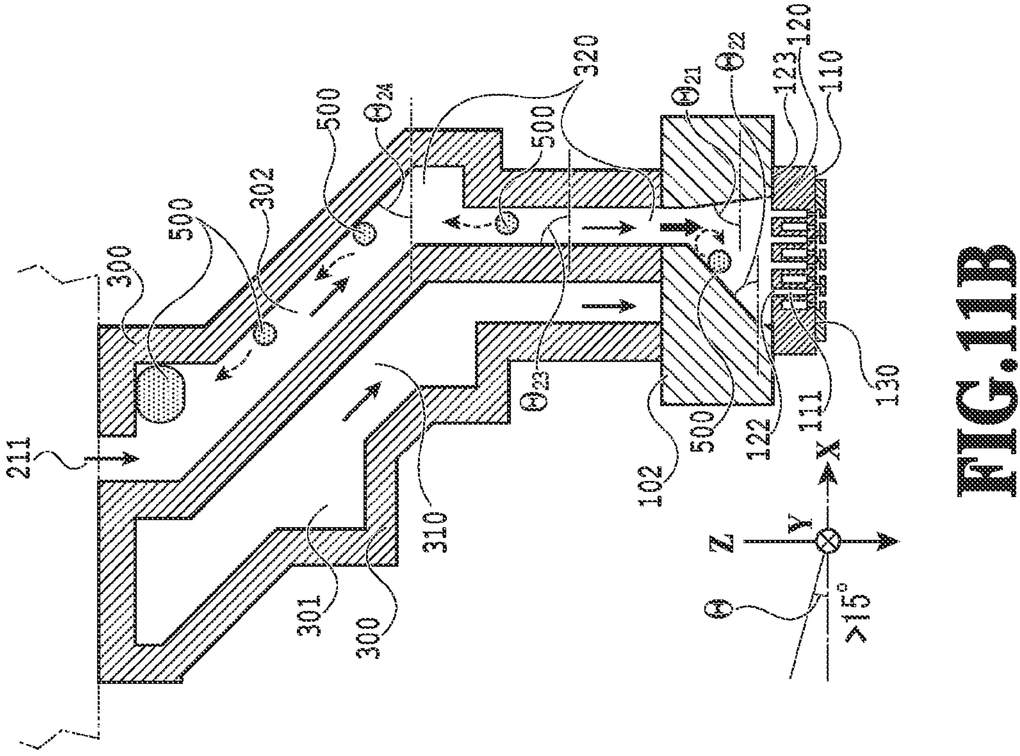
FIG. 11B is a cross-sectional diagram showing the first ink connection flow path and the second ink connection flow path.

FIG. 11A and FIG. 11B are each a diagram showing the ink flow and the behavior of the air bubbles 500 in a case where printing is performed by using the majority of the ejection ports shown in FIG. 6. FIG. 11A is a cross-sectional diagram showing the first ink connection flow path 310 that is connected with the first pressure control chamber 211 and FIG. 11B is a cross-sectional diagram showing the second ink connection flow path 320 that is connected with the second pressure control chamber 221. The positions of the cross sections in FIG. 11A and FIG. 11B are the same as those in FIG. 10A and FIG. 10B. In a case where printing is performed by using the majority of the ejection ports, a greater amount of ink than that in the circulation flow in the non-printing state shown in FIG. 10A and FIG. 10B is supplied to the pressure chamber 113 and a large flow occurs in each flow path. Further, in the first ink connection flow path 310 and the second ink connection flow path 320, the ink circulation flow is the flow toward the pressure chamber 113. By an increase in the ink flow rate, the ink flow velocity increases on the whole in the direction toward the pressure chamber 113.

Particularly, in the first ink connection flow path 310 and the second ink connection flow path 320 configured with the support member 102 whose flow path cross-sectional area is relatively small, the flow whose velocity is high occurs and the dynamic pressure applied to the air bubbles 500 increases, and therefore, the possibility that the air bubbles 500 flow into the pressure chamber 113 becomes strong. Further, in a case of the present embodiment, the ejection energy in the pressure chamber 113 is generated by thermal energy by the heater 115, and therefore, the temperature of the printing element substrate 110 rises accompanying ejection. Because of this, the temperature within the circulation flow path that is formed within the support member 102 and the printing element substrate 110 becomes relatively high, and therefore, the possibility that the dissolved gas within ink becomes oversaturated and the air bubbles 500 occur becomes strong.

In a case where printing is performed by using the majority of the ejection ports as described above, it is necessary to move the air bubbles 500 to the first air bubble storage flow path 301 or the second air bubble storage flow path 302 by periodically bringing about the circulation state during non-printing, or stopping the circulation depending on the amount of ejected ink and the ejection time. The time required to move the air bubbles 500 may entail the termination of printing as described above and may reduce the productivity of printing. Because of this, in order to reduce the time required to move the air bubbles 500, it is also desirable to set the ceiling surface to an angle close to 90 degrees at which it is possible to use 100% of the component force of the buoyant force of the air bubbles 500 for the locomotive force.

As a modification example, there is a case where an ink temperature adjusting heater is mounted on the printing element substrate 110 and there is a case where a resin material whose thermal conductivity is low is employed for the support member 102 by giving importance to the temperature adjusting speed. In that case, the portion at which air bubbles caused by heat occur is limited to the vicinity of the Si substrate 120.

Further, the common supply flow path 11 that is formed within the printing element substrate 110 is formed by the Si substrate processing technique. Because of this, it is difficult to set a sufficient angle with respect to the surface on which the ejection port is arranged and the flow path cross-sectional area is very small, and therefore, it is difficult to guide the air bubbles 500 to the first air bubble storage flow path 301 by the buoyant force against the circulation flow. Because of this, it is necessary to periodically discharge the air bubbles 500 having occurred inside the common supply flow path 111 from the pressure chamber 113 by suction and the like depending on the amount of ejected ink and the printing time. However, the ink volume in the common supply flow path 111 is very small, and therefore, it is made possible to suppress the waste ink to a minimum.

Figure 12A:
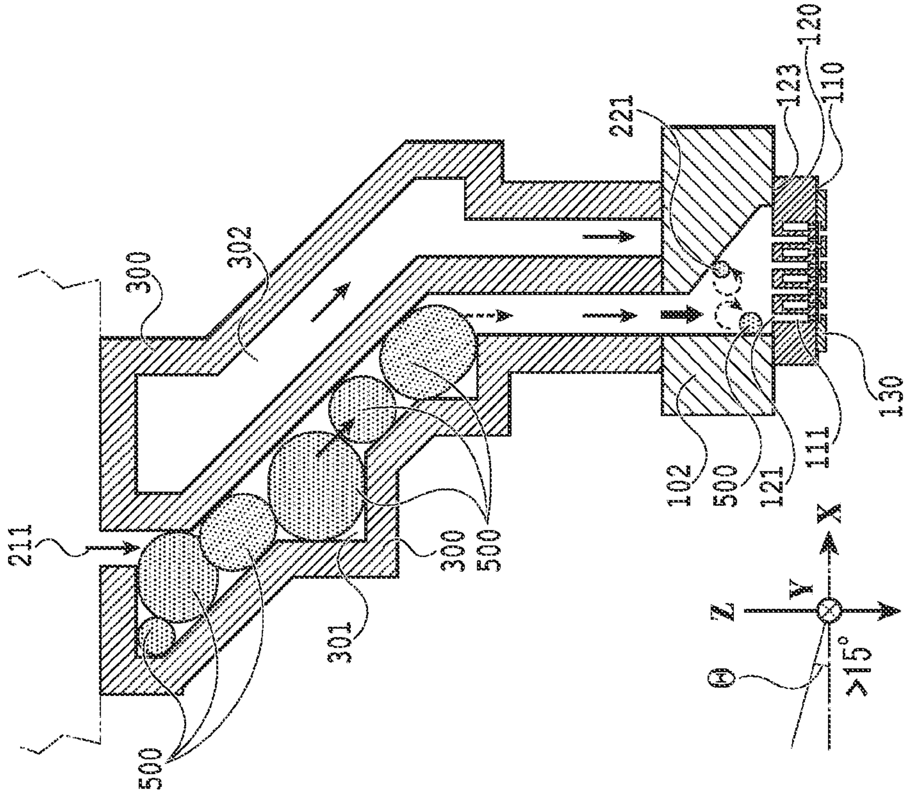
FIG. 12A is a cross-sectional diagram showing the first ink connection flow path and the second ink connection flow path.
Figure 12B:
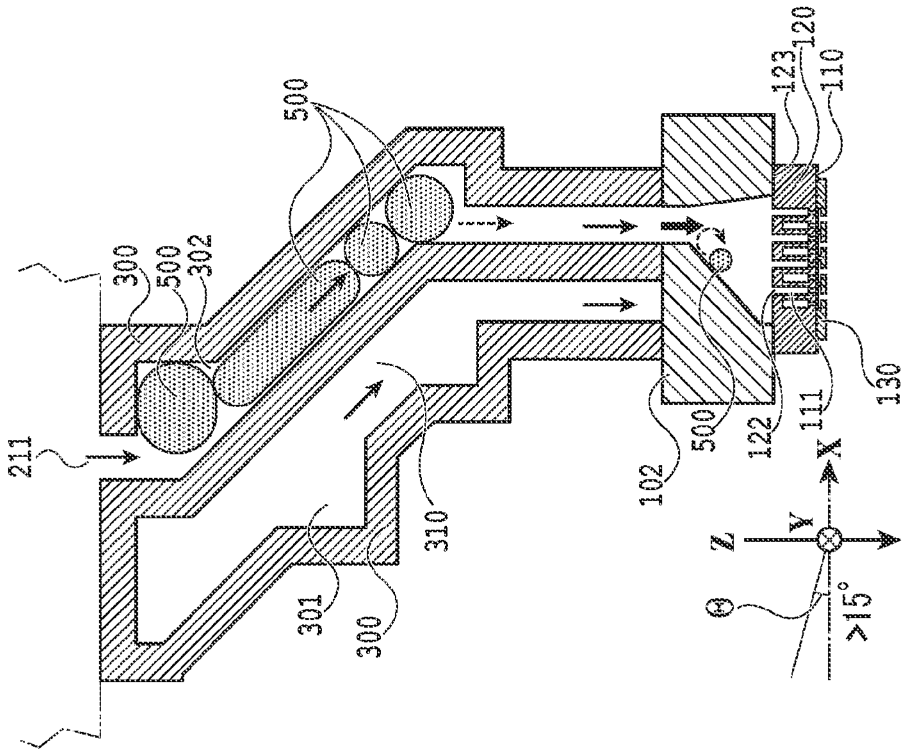
FIG. 12B is a cross-sectional diagram showing the first ink connection flow path and the second ink connection flow path.

FIG. 12A is a cross-sectional diagram showing the first air bubble storage flow path 301 in a case where a large amount of the air bubbles 500 is stored and FIG. 12B is a cross-sectional diagram showing the second air bubble storage flow path 302 in a case where a large amount of the air bubbles 500 is stored. The positions of the cross sections in FIG. 12A and FIG. 12B are the same as those in FIG. 10A and FIG. 10B. In a case where the air bubbles 500 unite to a size that almost occludes the flow path cross-sectional area, the drag caused by the ink flow becomes large and the air bubbles 500 are caused to flow into the pressure chamber 113.

However, the flow path cross-sectional area including the ceiling portions of the first air bubble storage flow path 301 and the second air bubble storage flow path 302 is larger than the minimum cross-sectional area within each air bubble storage flow path and on the flow path wall, a plurality of slit portions, not shown schematically, is provided along the direction of the ink flow. The slit portion is configured to be so sufficiently fine that the slit portion is not closed by the air bubbles 500. Because of this, the relative ink flow velocity within each air bubble storage flow path is low and it is made possible to cause ink to flow from the slit portion without moving the air bubbles 500. Due to this, it is possible to suppress the air bubbles 500 from flowing into the pressure chamber 113. In the present embodiment, the slit portion has the shape of a groove whose width is 0.5 mm and has a structure in which the air bubbles 500 stored and having united hardly occlude the slit portion.

Even though the slit portion is provided as described above, in a case where a predetermined amount of the air bubbles 500 gather in the first air bubble storage flow path 301 and the second air bubble storage flow path 302 and the flow path at which the cross-sectional area is small and the flow velocity becomes high is reached, there is a concern that the air bubbles 500 flow into the pressure chamber 113 by the ink dynamic pressure and an ejection failure may be caused. Because of this, in a case where a predetermined amount of the air bubbles 500 gather, in order to discharge the air bubbles 500 to the outside, it is necessary to perform the recovery operation by suction from the ejection port or the like. A suction recovery device that performs the recovery operation by suction or the like is the configuration widely employed in an ink jet printer for stability of printing and is not a new configuration for removing the air bubbles 500 having gathered in the first air bubble storage flow path 301 and the second air bubble storage flow path 302.

Figure 13:
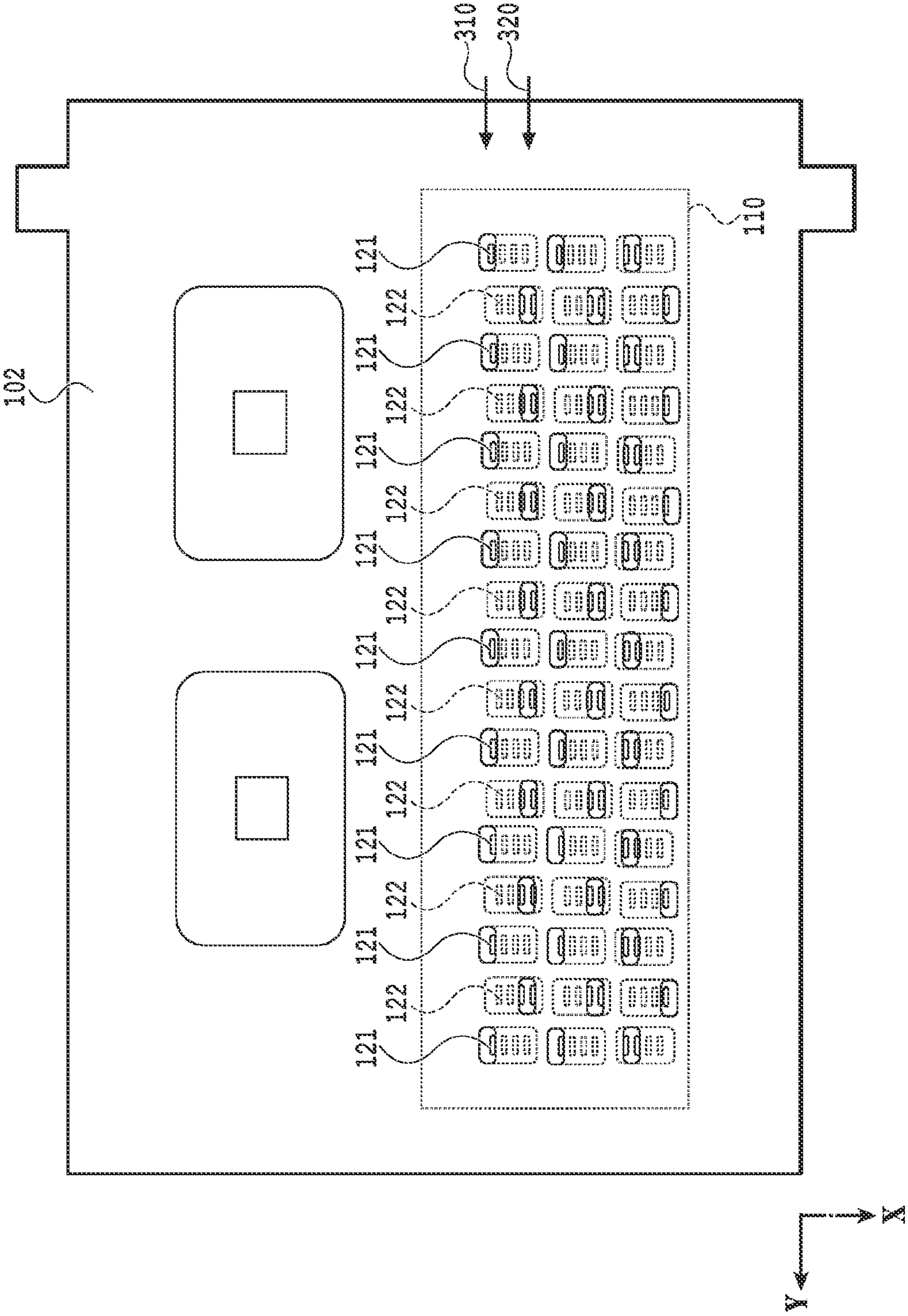
FIG. 13 is a diagram showing a section along XIII-XIII in FIG. 7.

FIG. 13 is a diagram showing the cross section along XIII-XIII in FIG. 7. By the first air bubble storage flow path 301 and the second air bubble storage flow path 302 having the flow path cross-sectional area as wide as possible, it is made possible to move air bubbles having occurred to the ceiling portion. Because of this, it is desirable to form the first air bubble storage flow path 301 and the second air bubble storage flow path 302 whose flow path cross-section area is increased up to the vicinity of the printing element substrate 110, at which the air bubbles 500 are likely to occur.

As in the present embodiment, in a case where the common supply flow path opening 121 is arranged at nine portions in the ejection port column direction and the common collection flow path opening 122 is arranged at eight portions alternately, each opening is connected by a flow path having a length of the long side in the Y-direction, which is longer than or equal to that of each of both ends of the ejection port column, respectively. In that case, it is necessary to arrange a branch portion that supplies ink to each opening arranged at a narrow pitch, but in the present embodiment, as shown in the cross-sectional diagram in FIG. 8A and FIG. 8B, the portion that is connected to the printing element substrate 110 is configured as a branch portion having a shape having the oblique side of a triangular shape inclined in the X-direction, the scan direction. The oblique side of the triangular shape of the first ink connection flow path 310 that is connected to the common supply flow path opening 121 and the oblique side of the triangular shape of the second ink connection flow path 320 that is connected to the common collection flow path opening 122 are arranged in the opposite directions, respectively.

As described above, between the circulation unit and the supply flow path that communicates with the pressure chamber, the flow path is provided, which has the vertical cross-sectional area in the liquid circulation direction, which is double or more the vertical cross-sectional area in the liquid circulation direction in the supply flow path, and which is inclined with respect to the gravitational direction, and whose component force of the normal vector has the component in the gravitational direction. Due to this, it is possible to provide a liquid ejection head and a liquid ejection apparatus, which suppress the occurrence of an ejection failure, without increasing the size of the apparatus.

(Modification Example)

A modification example of the above-described embodiment is explained.

Figure 14:
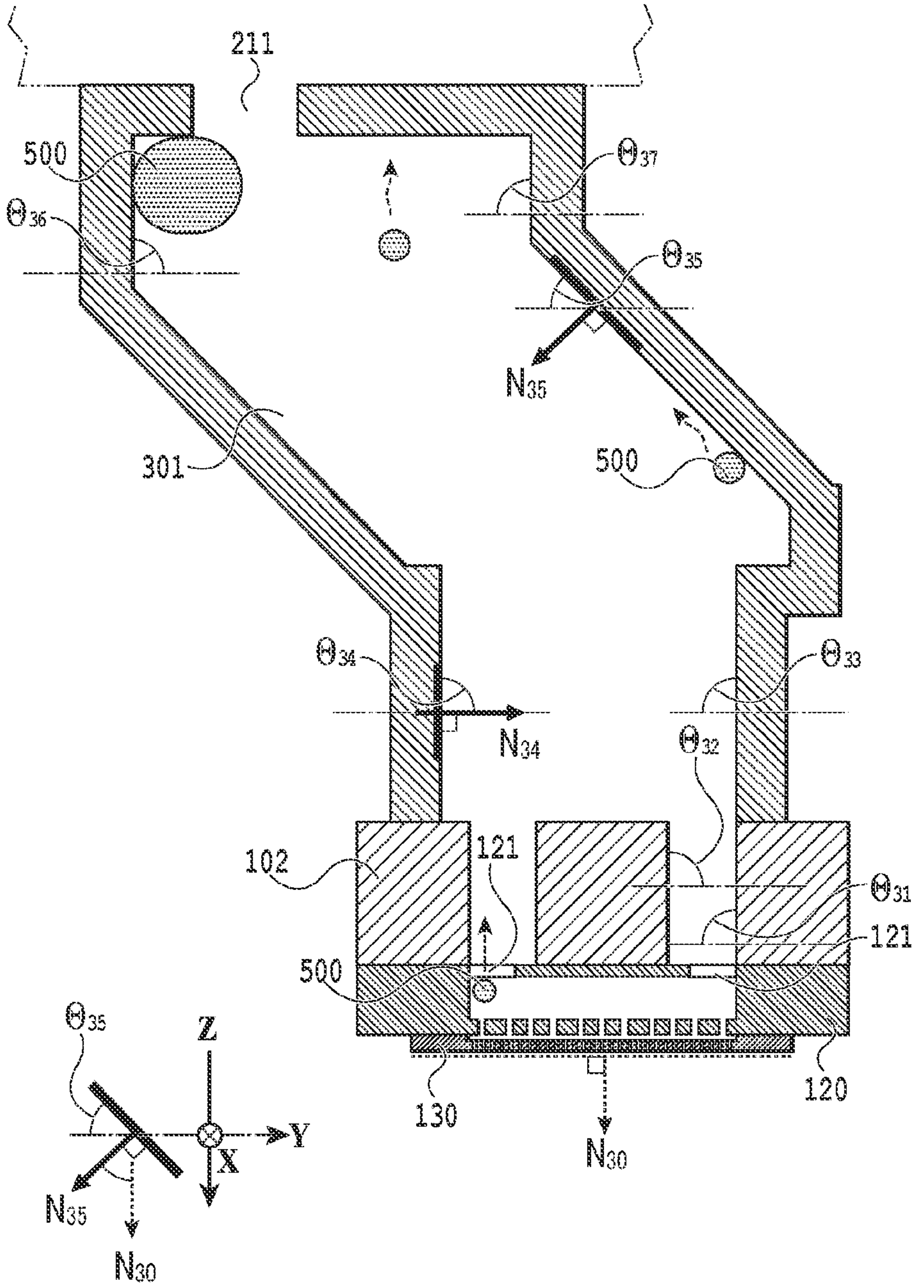
FIG. 14 is a cross-sectional diagram in an ejection port column direction of the first ink connection flow path.
Figure 15A:
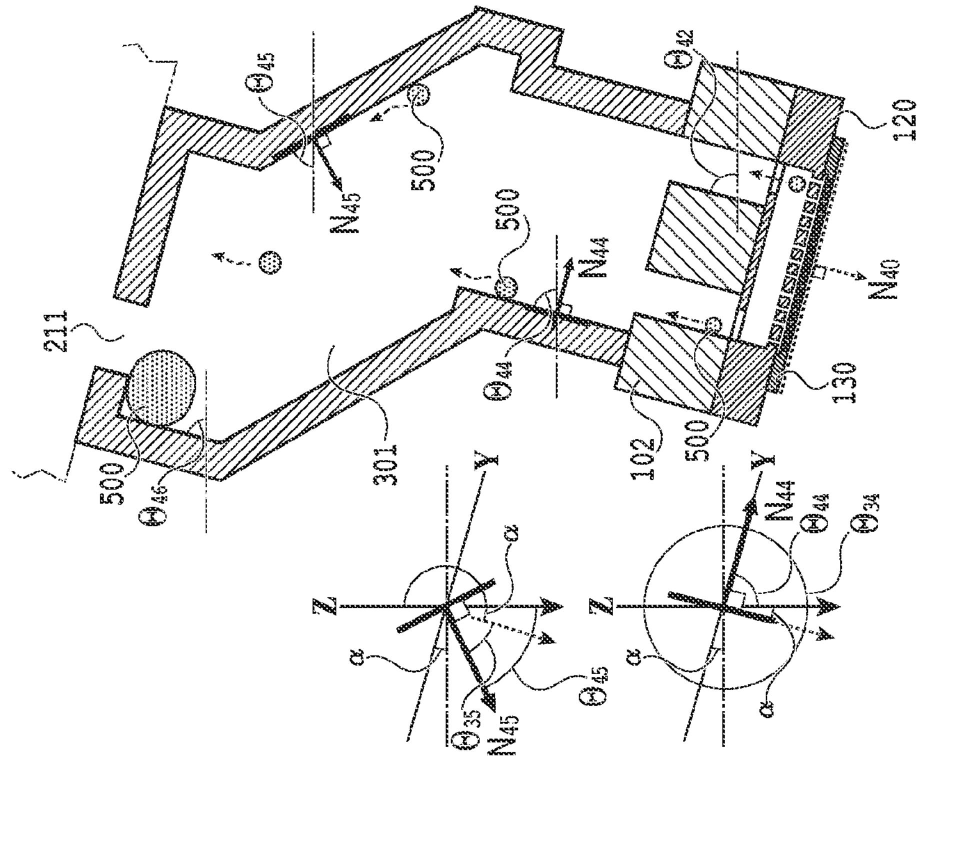
FIG. 15A is a cross-sectional diagram in the ejection port column direction of the first ink connection flow path.
Figure 15B:
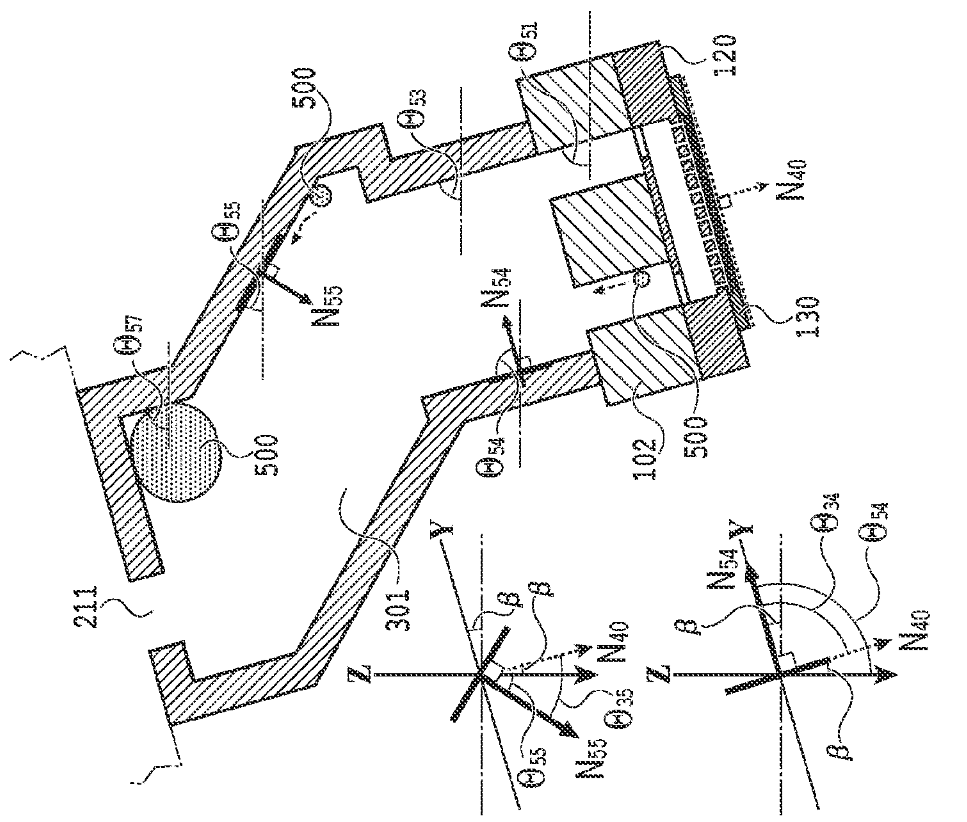
FIG. 15B is a cross-sectional diagram in the ejection port column direction of the first ink connection flow path.

FIG. 14 is a cross-sectional diagram in the ejection port column direction (Y-direction) of the first ink connection flow path 310 and FIG. 15A and FIG. 15B are each a cross-sectional diagram in the ejection port column direction (Y-direction) of the first ink connection flow path 310 in a case where the conveyance angle of a printing medium is changed. The external shape of the liquid ejection head 1000 is desirable because the width of the printing apparatus becomes small by reducing the width in the scan direction (X-direction). Further, also in a case where a plurality of the liquid ejection heads 1000 is mounted, the width by which the carriage 10 is moved becomes small, and therefore, it is desirable to reduce the width in the scan direction (Y-direction) because the productivity improves.

In a case of a liquid ejection head that ejects two color inks, it is made possible to achieve a reduction in width by mounting the circulation unit 200 (see FIG. 3) at a position shifted in the Y-direction. In this modification example also, as described previously, the inner wall angles θ (θ31 to θ37) of the first ink connection flow path 310, the first air bubble storage flow path 301, the second ink connection flow path 320, and the second air bubble storage flow path 302 are configured so as to be 45 degrees or more with respect to the plane perpendicular to a gravitational direction vector.

The liquid ejection head 1000 performs printing while moving in the scan direction (X-direction) for the printing medium P, and therefore, there is a case where the posture changes depending on a conveyance angle α and an angle β of the printing medium P as in FIG. 15A and FIG. 15B. The high degree of freedom of the conveyance angle of the printing medium P is desirable because the use range increases for a variety of purposes.

It is necessary to make the distance between the printing medium P and the plane on which the ejection port 114 is arranged as uniform as possible, that is, it is necessary to arrange the ejection port 114 parallel to the printing medium P in order to keep high the accuracy of landing of ejected ink onto the printing medium P. In that case, in order to make the effect of the present invention effective, for inner wall angles θ (θ42, θ44 to θ46) (θ51, θ53 to θ55, θ57), an angle of 15 degrees or more is secured with respect to the plane perpendicular to the gravitational direction vector by taking into consideration the attachment angle of the liquid ejection head 1000. The liquid ejection head 1000 shown in FIG. 14 is configured so that the effect of the present invention is obtained even in view of the angle α and the angle θ shown in FIG. 15A and FIG. 15B.

The configuration of the present embodiment is put in order by the definition with a normal vector N30 to the plane on which the ejection port 114 is arranged being taken as a reference. In the aspect shown in FIG. 14, like the liquid ejection head 1000, the arrangement plane of the ejection port 114 is the same as the vertical plane in the gravitational direction (Z-direction), and therefore, the normal vector N30 is the same as the gravitational direction (Z-direction). For the angle θ35 of the flow path inner wall surface to exhibit the effect of the present invention, the condition is that the angle formed by a normal vector N35 and the gravitational direction vector (Z-direction) be 15 degrees or more. This is equivalent to the condition that the angle formed by the normal vector N35 of the inner wall surface and the normal vector N30 of the arrangement plane of the ejection port 114 be 15 degrees or more.

By the normal vector of the arrangement plane of the ejection port 114 of the liquid ejection head 1000 being equal to the gravitational direction vector (Z-direction), the ink ejection direction and the gravitational direction are the same direction. Due to this, the ink droplet is not affected by the gravity force in the planar direction of the printing medium P while the ink droplet is flying and after the ink droplet lands onto the printing medium P, and therefore, it is possible to obtain a high printing accuracy.

On the other hand, in a case of the modification example shown in FIG. 15A and FIG. 15B, the arrangement plane of the ejection port 114 of the liquid ejection head 1000 is arranged on the surface parallel to the conveyance surface of the printing medium P. At this time, the angle formed by normal vectors N44 and N45 of the flow path inner wall in FIG. 15A and a normal vector N40 of the arrangement plane of the ejection port 114 is the same as θ34 and θ35 shown in FIG. 14. It is possible to verify whether each flow path inner wall can exhibit the effect of the present invention by taking into consideration the angle formed by the normal vector N40 of the arrangement plane of the ejection port 114 and the vector in the gravitational direction (Z-direction).

In a case of the modification example shown in FIG. 15A, the angle formed by the normal vector N40 of the arrangement plane of the ejection port 114 and the vector in the gravitational direction (Z-direction) is the angle α and this is the same as the angle between the arrangement plane of the ejection port 114 and the virtual plane in the gravitational direction. With the angle θ45, it is possible to obtain the effect of the present invention because the angle obtained by adding θ35 defined in FIG. 14 and the angle α is 15 degrees or more. Similarly, with the angle θ44, it is possible to obtain the effect of the present invention because the angle obtained by performing subtraction between θ34 defined in FIG. 14 and the angle α is 15 degrees or more.

In a case where the influence of the angle α is taken into consideration, it is possible to verify whether the necessary angle or more is secured by performing subtraction on a condition that the angle formed by the normal vector N40 of the arrangement plane of the ejection port 114 as a reference and the vector in the gravitational direction (Z-direction) and the angle formed by the normal vector N40 and the normal vector (N44, N45) of the flow path inner wall include the same angle component, and performing addition on a condition that they do not include the same angle component.

In the example shown in FIG. 15B also, it is possible to verify whether the effect of the present invention can be obtained by similarly checking the angle R as in the explanation of FIG. 14 described above.

<Reference Example>

A more detailed reference example of the liquid ejection apparatus explained so far is explained.

<Pressure Adjustment Unit>

Figures 16A, 16B, 16C:
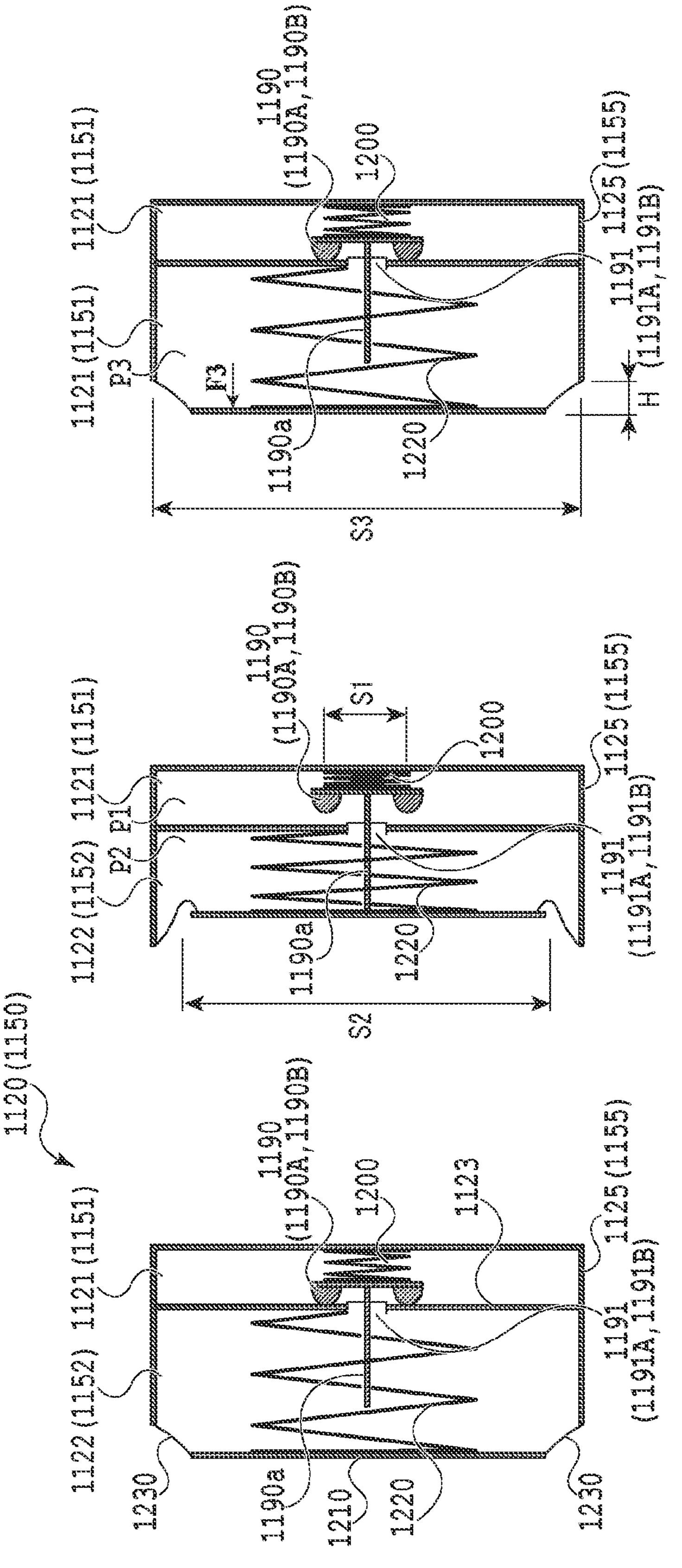
FIG. 16A is a diagram showing an example of a pressure adjustment unit.
FIG. 16B is a diagram showing an example of the pressure adjustment unit.
FIG. 16C is a diagram showing an example of the pressure adjustment unit.

FIG. 16A to FIG. 16C are each a diagram showing an example of a pressure adjustment unit. With reference to FIG. 16A to FIG. 16C, the configuration and work of a pressure adjustment unit (first pressure adjustment unit 1120, second pressure adjustment unit 1150) that is incorporated in the liquid ejection head 1000 described above are explained in more detail. The first pressure adjustment unit 1120 and the second pressure adjustment unit 1150 have substantially the same configuration. Because of this, in the following, explanation is given by taking the first pressure adjustment unit 1120 as an example and for the second pressure adjustment unit 1150, only symbols of the portions corresponding to those of the first pressure adjustment unit 1120 are described in FIG. 16A to FIG. 16C. In a case of the second pressure adjustment unit 1150, a first valve chamber 1121 that is explained in the following is changed to a second valve chamber 1151 when read, and a first pressure control chamber 1122 is changed to a second pressure control chamber 1152 when read.

The first pressure adjustment unit 1120 has the first valve chamber 1121 and the first pressure control chamber 1122 formed within a cylindrical casing 1125. The first valve chamber 1121 and the first pressure control chamber 1122 are separated from each other by a partition 1123 provided within the cylindrical casing 1125. However, the first valve chamber 1121 communicates with the first pressure control chamber 1122 via a communication port 1191 formed in the partition 1123. In the first valve chamber 1121, a valve 1190 is provided, which switches communication and shut-off between the first valve chamber 1121 and the first pressure control chamber 1122 through the communication port 1191. The valve 1190 is held at the position facing the communication port 1191 by a valve spring 1200 and has a configuration that enables the valve 1190 to come into close contact with the partition 1123 by the biasing force of the valve spring 1200. By the valve 1190 coming into close contact with the partition 1123, the ink flow through the communication port 1191 is shut off. In order to enhance the close contact with the partition 1123, it is preferable for the contact portion of the valve 1190 with the partition 1123 to be formed by an elastic member. Further, at the center portion of the valve 1190, a valve shaft **1190*a* that is inserted into the communication port 1191 is provided so as to protrude therefrom. By pressing the valve shaft 1190*a* against the biasing force of the valve spring 1200, the valve 1190 separates from the partition 1123 and the ink flow through the communication port 1191 is enabled. In the following, the state where the ink flow through the communication port 1191 is shut off by the valve 1190 is referred to as "closed state" and the state where the ink flow through the communication port 1191** is enabled is referred to as "open state".

The opening of the cylindrical casing 1125 is occluded by a flexible member 1230 and a pressing plate 1210. By the flexible member 1230, the pressing plate 1210, the circumferential wall of the casing 1125, and the partition 1123, the first pressure control chamber 1122 is formed. The pressing plate 1210 is configured to be capable of displacing as the flexible member 1230 displaces. The material of the pressing plate 1210 and the flexible member 1230 is not limited particularly, but for example, it is possible to configure the pressing plate 1210 by a resin-molded part and configure the flexible member 1230 by a resin film. In this case, it is possible to fix the pressing plate 1210 to the flexible member 1230 by thermal welding.

Between the pressing plate 1210 and the partition 1123, a pressure adjustment spring 1220 (biasing member) is provided. By the biasing force of the pressure adjustment spring 1220, the pressing plate 1210 and the flexible member 1230 are biased in the direction in which the inner volume of the first pressure control chamber 1122 increases as shown in FIG. 16A. Further, in a case where the pressure within the first pressure control chamber 1122 decreases, the pressing plate 1210 and the flexible member 1230 displace in the direction in which the inner volume of the first pressure control chamber 1122 decreases against the pressure of the pressure adjustment spring 1220.

Then, in a case where the inner volume of the first pressure control chamber 1122 decreases to a predetermined volume, the pressing plate 1210 comes into contact with the valve shaft **1190*a* of the valve 1190. After that, in a case where the inner volume of the first pressure control chamber 1122 further decreases, the valve 1190 moves, together with the valve shaft 1190***a*, against the biasing force of the valve spring 1200 and separates from the partition 1123. Due to this, the communication port 1191 enters the open state (state in FIG. 16B).

In the present embodiment, the connection setting within the circulation path is performed so that the pressure within the first valve chamber 1121 in a case where the communication port 1191 enters the open state is higher than the pressure within the first pressure control chamber 1122. Due to this, in a case where the communication port 1191 enters the open state, ink flows into the first pressure control chamber 1122 from the first valve chamber 1121. By this ink inflow, the flexible member 1230 and the pressing plate 1210 displace in the direction in which the inner volume of the first pressure control chamber 1122 increases. As a result of that, the pressing plate 1210 separates from the valve shaft 1190*a* of the valve 1190 and the valve 1190 comes into close contact with the partition 1123 by the biasing force of the valve spring 1200 and the communication port 1191 enters the closed state (state in FIG. 16C).

As described above, in the first pressure adjustment unit 1120 in the present embodiment, in a case where the pressure within the first pressure control chamber 1122 decreases to a predetermined pressure or lower (for example, in a case where negative pressure becomes high), ink flows thereinto from the first valve chamber 1121 via the communication port 1191. Due to this, the configuration is designed so that the pressure within the first pressure control chamber 1122 does not decrease any more. Consequently, the first pressure control chamber 1122 is controlled so that the pressure is kept within a predetermined range.

Next, the pressure within the first pressure control chamber 1122 is explained in more detail.

The state (state in FIG. 16B) is considered where the flexible member 1230 and the pressing plate 1210 displace in accordance with the pressure within the first pressure control chamber 1122 and the pressing plate 1210 comes into contact with the valve shaft 1190*a* and the communication port 1191 enters the open state as described previously. At this time, the relationship of the forces that are exerted on the pressing plate 1210 is expressed by formula 1 below.

$$P2\times S2+F2+(P1-P2)\times S1+F1=0 \quad \text{formula 1}$$

Further, in a case where formula 1 is solved with respect to P2, $$P2=-(F1+F2+P1\times S1)/(S2-S1) \quad \text{formula 2}$$

is obtained.

- P1: pressure (gauge pressure) within first valve chamber 1121
- P2: pressure (gauge pressure) within first pressure control chamber 1122
- F1: spring force of valve spring 1200
- F2: spring force of pressure adjustment spring 1220
- S1: pressure-receiving area of valve 1190
- S2: pressure-receiving area of pressing plate 1210

Here, as regards the direction of the spring force F1 of the valve spring 1200 and the spring force F2 of the pressure adjustment spring 1220, the direction in which the valve 1190 and the pressing plate 1210 are pressed is taken to be the positive direction (in FIG. 16B, in the leftward direction). Further, as regards the pressure P1 within the first valve chamber 1121 and the pressure P2 within the first pressure control chamber 1122, the configuration is designed so that P1 satisfies the relationship of P1≥P2.

The pressure P2 within the first pressure control chamber 1122 in a case where the communication port 1191 enters the open state is determined by formula 2 and the configuration is designed so that the relationship of P1≥P2 holds, and therefore, in a case where the communication port 1191 enters the open state, ink flows into the first pressure control chamber 1122 from the first valve chamber 1121. As a result of that, the pressure P2 within the first pressure control chamber 1122 does not decrease any more and P2 is kept at a pressure within a predetermined range.

On the other hand, the relationship of the forces that are exerted on the pressing plate 1210 in a case where the pressing plate 1210 enters the state where the pressing plate 1210 is no longer in contact with the valve shaft 1190*a* and the communication port 1191 enters the closed state as shown in FIG. 16C is as expressed by formula 3.

$$P3\times S3+F3=0 \quad \text{formula 3}$$

Here, in a case where formula 3 is solved with respect to P3, $$P3=-F3/S3 \quad \text{formula 4}$$

is obtained.

- F3: spring force of pressure adjustment spring 1220 in a case where pressing plate 1210 and valve shaft 1190*a* are in the state where they are not in contact
- P3: pressure (gauge pressure) within first pressure control chamber 1122 in a case where pressing plate 1210 and valve shaft 1190*a* are in the state where they are not in contact
- S3: pressure-receiving area in a case where pressing plate 1210 and valve shaft 1190*a* are in the state where they are not in contact Here, FIG. 16C shows the state where the pressing plate 1210 and the flexible member 1230 have displaced in the rightward direction in FIG. 16C to the limit up to which they can displace. In accordance with the amount of displacement while the pressing plate 1210 and the flexible member 1230 displace to the state in FIG. 16C, the pressure P3 within the first pressure control chamber 1122, the spring force F3 of the pressure adjustment spring 1220, and the pressure-receiving area S3 of the pressing plate 1210 change. Specifically, in a case where the pressing plate 1210 and the flexible member 1230 are located at the positions more distant in the leftward direction in FIG. 16C from the positions of the pressing plate 1210 and the flexible member 1230 shown in FIG. 16C, the pressure-receiving area 3 of the pressing plate 120 becomes small and the spring force F3 of the pressure adjustment spring 1220 becomes strong. As a result of that, in accordance with the relationship expressed by formula 4, the pressure P3 within the first pressure control chamber 1122 becomes low. Consequently, in accordance with formula 2 and formula 4, during the transition from the state in FIG. 16B into the state in FIG. 16C, the pressure within the first pressure control chamber 1122 gradually rises (that is, the negative pressure becomes low and becomes a value closer to the positive pressure side). That is, the pressure within the first pressure control chamber 1122 gradually rises while the pressing plate 1210 and the flexible member 1230 gradually displace in the rightward direction from the state where the communication port 1191 is in the closed state and finally reach the limit up to which the inner volume of the first pressure control chamber 1122 can increase. That is, the negative pressure becomes low.

<Circulation Pump>

Figure 17B:
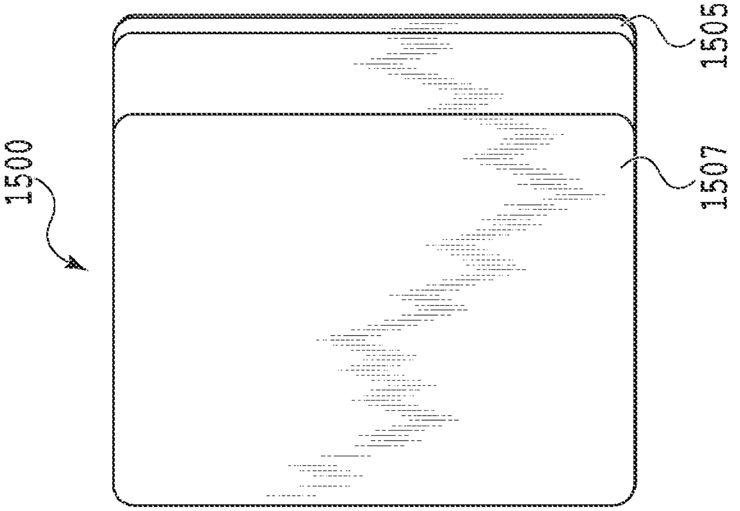
FIG. 17B is an outer appearance perspective diagram of the circulation pump.
Figure 17A:
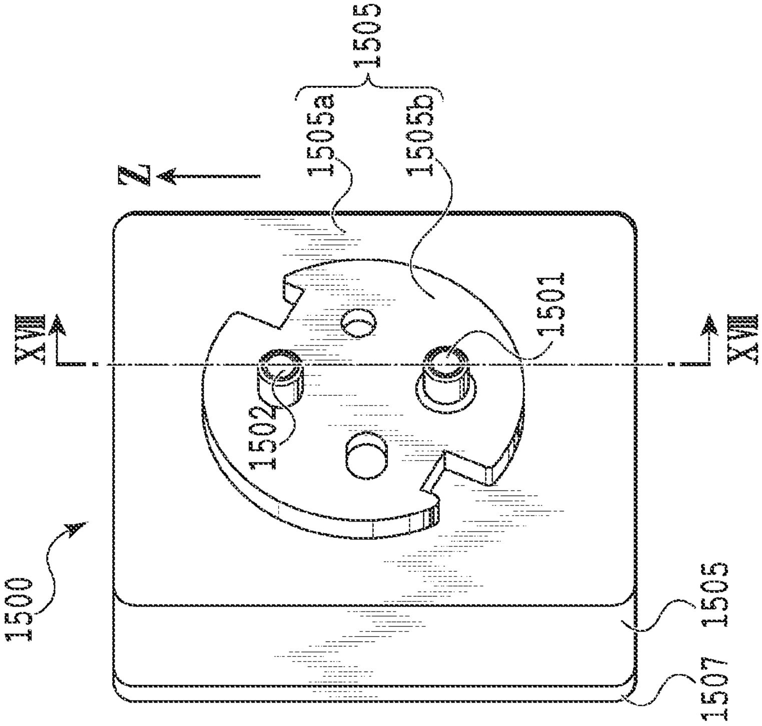
FIG. 17A is an outer appearance perspective diagram of a circulation pump.
Figure 18:
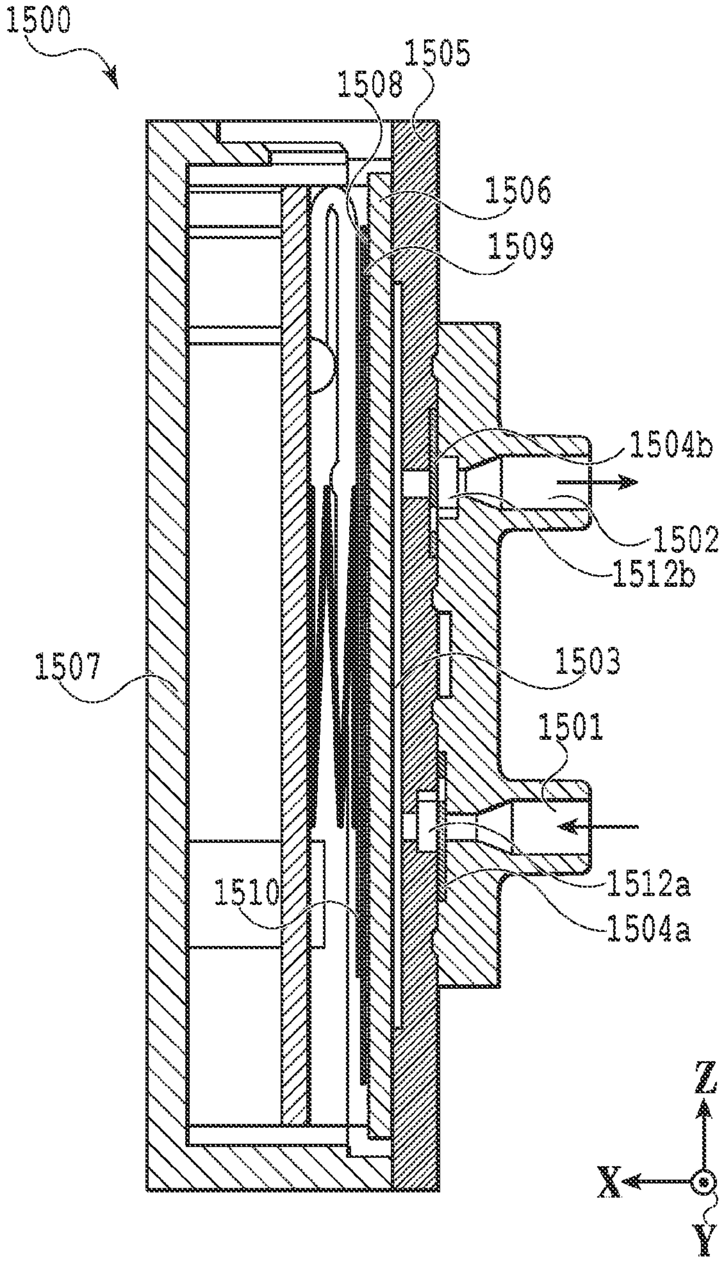
FIG. 18 is a cross-sectional diagram along an XVIII-XVIII line of the circulation pump shown in FIG. 17A.

Next, with reference to FIG. 17A, FIG. 17B, and FIG. 18, the configuration and work of a circulation pump 1500 that is incorporated in the above-described liquid ejection head 1000 described above are explained in detail.

FIG. 17A and FIG. 17B are each an outer appearance perspective diagram of the circulation pump 1500. FIG. 17A is an outer appearance perspective diagram showing the front side of the circulation pump 1500 and FIG. 17B is an outer appearance perspective diagram showing the rear side of the circulation pump 1500. The outer shell of the circulation pump 1500 includes a pump casing 1505 and a cover 1507 fixed to the pump casing 1505. The pump casing 1505 includes a casing main body 1505*a* and a flow path connection member 1505*b* caused to adhere and be fixed to the external surface of the casing main body 1505*a*. Each of the casing main body 1505*a* and the flow path connection member 1505*b* is provided with a pair of through holes communicating with each other at two different positions. The pair of through holes provided at one of the positions forms a pump supply hole 1501 and the pair of through holes provided at the other position forms a pump discharge hole 1502. The pump supply hole 1501 is connected to a pump entrance flow path 1170 connected to the second pressure control chamber 1152 and the pump discharge hole 1502 is connected to a pump exit flow path 1180 connected to the first pressure control chamber 1122. The ink supplied from the pump supply hole 1501 passes through a pump chamber 1503 (see FIG. 18), to be described later, and is discharged from the pump discharge hole 1502.

FIG. 18 is a cross-sectional diagram along a XVII-XVII line of the circulation pump 1500 shown in FIG. 17A. To the inner surface of the pump casing 1505, a diaphragm 1506 is joined and the pump chamber 1503 is formed between the diaphragm 1506 and a concave portion formed in the inner surface of the pump casing 1505. The pump chamber 1503 communicates with the pump supply hole 1501 and the pump discharge hole 1502 formed in the pump casing 1505. Further, at the middle portion of the pump supply hole 1501, a check valve 1504*a* is provided and at the middle portion of the pump discharge hole 1502, a check valve 1504*b* is provided. Specifically, the check valve 1504*a* is arranged so as to be capable of moving to the left in FIG. 18 in a space 1512*a* whose part is formed at the middle portion of the pump supply hole 1501. Further, the check valve 1504*b* is arranged so as to be capable of moving to the right in FIG. 18 in a space 1512*b* whose part is formed at the middle portion of the pump discharge hole 1502.

In a case where the pump chamber 1503 is depressurized by the diaphragm 1506 displacing to increase the inner volume of the pump chamber 1503, the check valve 1504*a* separates (that is, moves to the left in FIG. 18) from the opening of the pump supply hole 1501 within the space 1512*a*. By the check valve 1504*a* separating from the opening of the pump supply hole 1501 within the space 1512*a*, the open state is brought about where the ink flow through the pump supply hole 1501 is enabled. Further, in a case where the pump chamber 1503 is pressurized by the diaphragm 1506 displacing to reduce the inner volume of the pump chamber 1503, the check valve 1504*a* comes into close contact with the wall surface on the periphery of the opening of the pump supply hole 1501. As a result of this, the closed state is brought about where the ink flow through the pump supply hole 1501 is shut off.

On the other hand, in a case where the pump chamber 1503 is depressurized, the check valve 1504*b* comes into close contact with the wall surface on the periphery of the opening of the pump casing 1505 and the closed state is brought about where the ink flow through the pump discharge hole 1502 is shut off. Further, in a case where the pump chamber 1503 is pressurized, the check valve 1504*b* separates from the opening of the pump casing 1505 and moves to the side of the space 1512*b* (that is, moves to the right in FIG. 18) and enables the ink flow through in the pump discharge hole 1502.

The material of each of the check valves 1504*a* and 1504*b* may be any one that can be deformed in accordance with the pressure within the pump chamber 1503 and it is possible to form the check valves 1504*a* and 150*b* by, for example, an elastic member, such as EPDM and elastomer, or a film or a thin plate of polypropylene or the like.

As described previously, the pump chamber 1503 is formed by joining the pump casing 1505 and the diaphragm 1506 together. Consequently, in a case where the diaphragm 1506 deforms, the pressure within the pump chamber 1503 changes. For example, in a case where the diaphragm 1506 displaces to the side of the pump casing 1505 (displaces to the right in FIG. 18) and the inner volume of the pump chamber 1503 decreases, the pressure within the pump chamber 1503 rises. Due to this, the check valve 1504*b* arranged to face the pump discharge hole 1502 enters the open state and the ink in the pump chamber 1503 is discharged. At this time, the check valve 1504*a* arranged to face the pump supply hole 1501 comes into close contact with the wall surface on the periphery of the pump supply hole 1501, and therefore, the backflow of ink from the pump chamber 1503 to the pump supply hole 1501 is suppressed.

In contrast to the above, in a case where the diaphragm 1506 displaces in the direction in which the pump chamber 1503 expands, the pressure within the pump chamber 1503 decreases. Due to this, the check valve 1504*a* arranged to face the pump supply hole 1501 enters the open state and ink is supplied to the pump chamber 1503. At this time, the check valve 1504*b* arranged in the pump discharge hole 1502 comes into close contact with the wall surface on the periphery of the opening formed in the pump casing 1505 and occludes the opening. Because of this, the backflow of ink from the pump discharge hole 1502 to the pump chamber 1503 is suppressed.

As described above, in the circulation pump 1500, by the diaphragm 1506 deforming to change the pressure within the pump chamber 1503, suction and discharge of ink are performed. At this time, in a case where bubbles enter the pump chamber 1503 in a mixed manner, even though the diaphragm 1506 displaces, the change in pressure within the pump chamber 1503 becomes small due to the expansion and contraction of the bubbles, and therefore, the amount of ink that is sent decreases. Consequently, the pump chamber 1503 is arranged to be parallel to the gravitational direction so that the bubbles having entered the pump chamber 1503 in a mixed manner are likely to gather in the upper area in the pump chamber 1503 and at the same time, the pump discharge hole 1502 is arranged above the center of the pump chamber 1503. Due to this, it is made possible to improve the discharge property of the bubbles within the pump, and therefore, it is possible to make an attempt to stabilize the flow rate.

<Flow of Ink within Liquid Ejection Head>

Figure 19A:
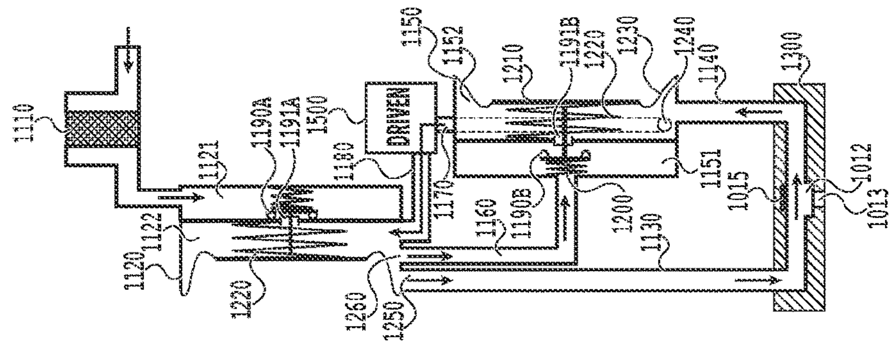
FIG. 19A is a diagram explaining an ink flow within the liquid ejection head.

FIG. 19A to FIG. 19E are each a diagram explaining the flow of ink within the liquid ejection head. With reference to FIG. 19A to FIG. 19E, the circulation of ink that is performed within the liquid ejection head 1000 is explained. In order to explain the ink circulation path more clearly, the relative position of each configuration (first pressure adjustment unit 1120, second pressure adjustment unit 1150, circulation pump 1500 and the like) in FIG. 19A to FIG. 19E is simplified. Because of this, the relative position of each configuration is different from the configuration in FIG. 27, to be described later. FIG. 19A schematically shows the flow of ink in a case where the printing operation to perform printing by ejecting ink from an ejection port 1013 is being performed. The arrow in FIG. 19A to FIG. 19E indicates the flow of ink. In the present embodiment, in a case where the printing operation is performed, both an external pump 1021 and the circulation pump 1500 start to be driven. Irrespective of the printing operation, the external pump 1021 and the circulation pump 1500 may be driven. Further, it is not necessary for the external pump 1021 and the circulation pump 1500 to be driven in an interlocking manner and they may be driven independently.

During the printing operation, the circulation pump 1500 is in the ON state (driven state) and the ink that flows out of the first pressure control chamber 1122 flows into a supply flow path 1130 and a bypass flow path 1160. The ink having flowed into the supply flow path 1130 flows into a collection flow path 1140 after passing through an ejection module 1300 and after that, is supplied to the second pressure control chamber 1152.

On the other hand, the ink having flowed into the bypass flow path 1160 from the first pressure control chamber 1122 flows into the second pressure control chamber 1152 via the second valve chamber 1151. The ink having flowed into the second pressure control chamber 1152 flows into the first pressure control chamber 1122 again after passing through the pump entrance flow path 1170, the circulation pump 1500, and the pump exit flow path 1180. At this time, the control pressure by the first valve chamber 1121 is set higher than the control pressure by the first pressure control chamber 1122 based on the relationship of formula 2 described previously. Consequently, the ink within the first pressure control chamber 1122 does not flow into the first valve chamber 1121 but is supplied to the ejection module 1300 via the supply flow path 1130 again. The ink having flowed into the ejection module 1300 flows into the first pressure control chamber 1122 again through the collection flow path 1140, the second pressure control chamber 1152, the pump entrance flow path 1170, the circulation pump 1500, and the pump exit flow path 1180. By the above, the ink circulation that is completed within the liquid ejection head 1000 is performed.

In the above ink circulation, the amount of ink that circulates (flow rate) within the ejection module 1300 is determined by the pressure difference in the control pressure between the first pressure control chamber 1122 and the second pressure control chamber 1152. Then, this pressure difference is set so that the amount of ink that circulates becomes an amount capable of suppressing the ink in the vicinity of the ejection port within the ejection module 1300 from thickening. Further, ink corresponding to the ink consumed in printing is supplied from the ink tank 2 to the first pressure control chamber 1122 via a filter 1110 and the first valve chamber 1121. The mechanism that supplies ink corresponding to the consumed ink is explained in detail. By the amount of ink decreasing within the circulation path by the amount corresponding to the ink consumed in printing, the pressure within the first pressure control chamber 1122 also decreases and as a result, the amount of ink within the first pressure control chamber 1122 also decreases. Accompanying the decrease in the ink within the first pressure control chamber 1122, the inner volume of the first pressure control chamber 1122 decreases. By the decrease in the inner volume of the first pressure control chamber 1122, a communication port 1191A enters the open state and ink is supplied from the first valve chamber 1121 to the first pressure control chamber 1122. In this ink that is supplied, a pressure loss occurs at the time of passing through the communication port 1191A from the first valve chamber 1121 and by the ink flowing into the first pressure control chamber 1122, the positive pressure ink is switched to the negative pressure state. Then, by the ink flowing into the first pressure control chamber 1122 from the first valve chamber 1121, the pressure within the first pressure control chamber 1122 rises and the inner volume of the first pressure control chamber 1122 increases and the communication port 1191A enters the closed state. As described above, in accordance with the consumption of ink, the communication port 1191A repeatedly switches between the closed state and the open state. Further, in a case where no ink is consumed, the communication port 1191A is kept in the closed state.

Figure 19B:
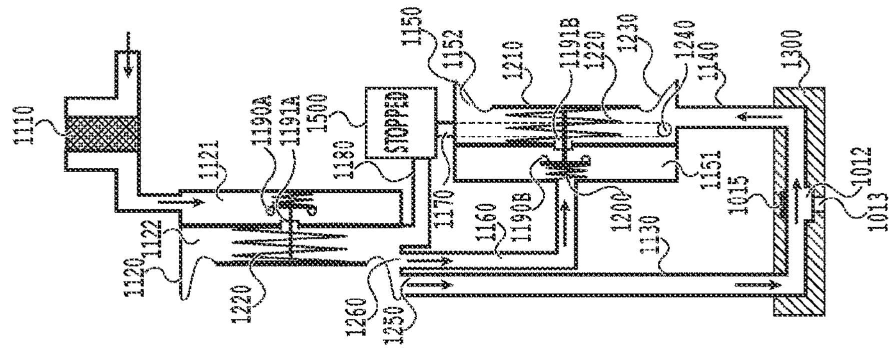
FIG. 19B is a diagram explaining an ink flow within the liquid ejection head.

FIG. 19B schematically shows the flow of ink immediately after the printing operation is completed and the circulation pump 1500 enters the OFF state (stop state). At the point in time at which the printing operation is completed and the circulation pump 1500 turns OFF, the pressure within the first pressure control chamber 1122 and the pressure within the second pressure control chamber 1152 are the control pressures during the printing operation. Because of this, in accordance with the pressure difference between the pressure within the first pressure control chamber 1122 and the pressure within the second pressure control chamber 1152, movement of ink as shown in FIG. 19B occurs. Specifically, the flow of ink occurs subsequently, in which the ink is supplied to the ejection module 1300 from the first pressure control chamber 1122 via the supply flow path 1130 and after that, the ink reaches the second pressure control chamber 1152 via the collection flow path 1140. Further, the flow of ink occurs also subsequently, in which the ink reaches the second pressure control chamber 1152 from the first pressure control chamber 1122 via the bypass flow path 1160 and the second valve chamber 1151.

The amount of the ink having moved from the first pressure control chamber 1122 to the second pressure control chamber 1152 by these ink flows is supplied from the ink tank 2 to the first pressure control chamber 1122 via the filter 1110 and the first valve chamber 1121. Because of this, the amount of contents within the first pressure control chamber 1122 is kept constant. In a case where the amount of contents within the first pressure control chamber 1122 is constant, from the relationship of formula 2 described previously, the spring force F1 of the valve spring 1200, the spring force F2 of the pressure adjustment spring 1220, the pressure-receiving area S1 of the valve 1190, and the pressure-receiving area S2 of the pressing plate 1210 are kept constant. Because of this, in accordance with the change in the pressure (gauge pressure) P1 within the first valve chamber 1121, the pressure within the first pressure control chamber 1122 is determined. Consequently, in a case where there is no change in the pressure P1 within the first valve chamber 1121, the pressure P2 within the first pressure control chamber 1122 is kept the same pressure as the control pressure during the printing operation.

Figure 19C:
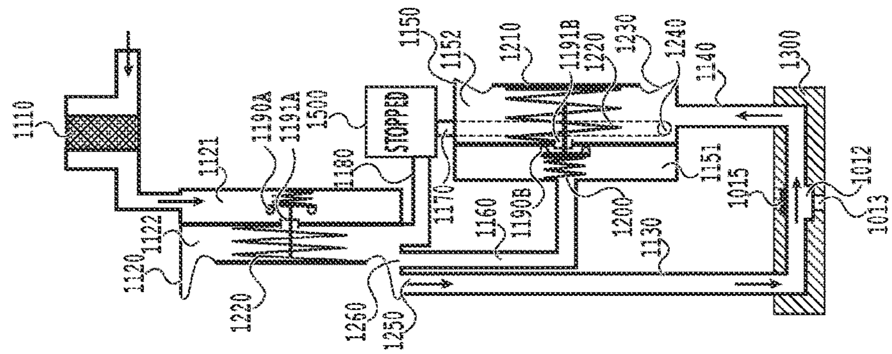
FIG. 19C is a diagram explaining an ink flow within the liquid ejection head.
Figure 19D:
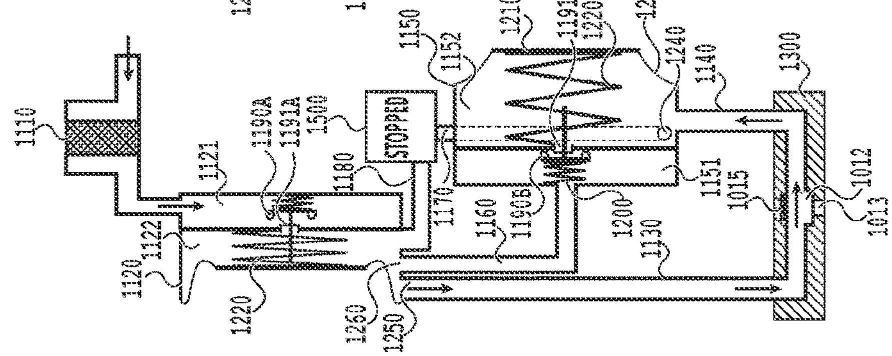
FIG. 19D is a diagram explaining an ink flow within the liquid ejection head.

On the other hand, the pressure within the second pressure control chamber 1152 changes over time in accordance with the change in the amount of contents accompanying the inflow of ink from the first pressure control chamber 1122. Specifically, during the transition from the state in FIG. 19B into the state where the communication port 1191 enters the closed state and the second valve chamber 1151 and the second pressure control chamber 1152 enter the non-communicating state as shown in FIG. 19C, the pressure within the second pressure control chamber 1152 changes in accordance with formula 2. After that, the pressing plate 1210 and the valve shaft 1190*a* enter the state where they are not in contact and the communication port 1191 enters the closed state. Then, as shown in FIG. 19D, ink flows into the second pressure control chamber 1152 from the collection flow path 1140. By this ink inflow, the pressing plate 1210 and the flexible member 1230 displace and until the inner volume of the second pressure control chamber 1152 reaches the maximum, the pressure within the second pressure control chamber 1152 changes in accordance with formula 4. That is, the pressure rises.

In a case where the state in FIG. 19C is brought about, the flow of ink from the first pressure control chamber 1122 to the second pressure control chamber 1152 via the bypass flow path 1160 and the second valve chamber 1151 no longer occurs. Consequently, only the flow occurs in which the ink within the first pressure control chamber 1122 is supplied to the ejection module 1300 via the supply flow path 1130 and after that, the ink reaches the second pressure control chamber 1152 via the collection flow path 1140. As described previously, the movement of ink from the first pressure control chamber 1122 to the second pressure control chamber 1152 occurs in accordance with the pressure difference between the pressure within the first pressure control chamber 1122 and the pressure within the second pressure control chamber 1152. Because of this, in a case where the pressure within the second pressure control chamber 1152 becomes equal to the pressure within the first pressure control chamber 1122, the movement of ink stops.

Figure 19E:
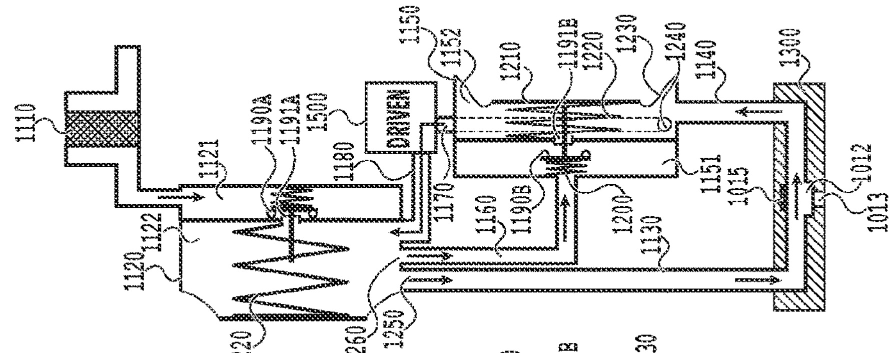
FIG. 19E is a diagram explaining an ink flow within the liquid ejection head.

Further, in the state where the pressure within the second pressure control chamber 1152 becomes equal to the pressure within the first pressure control chamber 1122, the second pressure control chamber 1152 expands into the state shown in FIG. 19D. In a case where the second pressure control chamber 1152 expands as shown in FIG. 19D, in the second pressure control chamber 1152, a reservoir portion capable of storing ink is formed. It takes about one to two minutes for the state to make a transition from the stop state of the circulation pump 1500 into the state in FIG. 19D, although the time may vary in accordance with the shape and size of the flow path and the nature of ink. In a case where the circulation pump 1500 is driven in the state shown in FIG. 19D where ink is stored in the reservoir portion, the ink in the reservoir portion is supplied to the first pressure control chamber 1122 by the circulation pump 1500. Due to this, as shown in FIG. 19E, the amount of ink in the first pressure control chamber 1122 increases and the flexible member 1230 and the pressing plate 1210 displace in the expansion direction. Then, in a case where the drive of the circulation pump 1500 continues, the state within the circulation path changes to the state as shown in FIG. 19A.

In the explanation described above, FIG. 19A is explained as an example at the time of the printing operation, but as described previously, circulation of ink may be performed without the printing operation. In this case also, the flow of ink as shown in FIG. 19A to FIG. 19E occurs in accordance with the drive and stop of the circulation pump 1500.

Further, as described above, in the present embodiment, the example is used in which a communication port 1191B in the second pressure adjustment unit 1150 enters the open state in a case where the circulation pump 1500 is driven and the circulation of ink is performed, and enters the closed state in a case where the circulation of ink stops, but the example is not limited to this. It may also be possible to set the control pressure so that the communication port 1191B in the second pressure adjustment unit 1150 remains in the closed state even in a case where the circulation pump 1500 is driven and the circulation of ink is performed. In the following, specific explanation is given along with the role of the bypass flow path 1160.

The bypass flow path 1160 that connects the first pressure adjustment unit 1120 and the second pressure adjustment unit 1150 is provided for preventing, for example, in a case where the negative pressure that occurs within the circulation path becomes higher than a predetermined value, the ejection module 1300 from being affected by that. Further, the bypass flow path 1160 is provided also for supplying ink to a pressure chamber 1012 from both sides of the supply flow path 1130 and the collection flow path 1140.

First, an example is explained in which in a case where the negative pressure becomes higher than a predetermined value, by providing the bypass flow path 1160, the ejection module 1300 is not affected by that. For example, there is a case where the characteristic (for example, viscosity) of ink changes due to a change in environmental temperature. In a case where the viscosity of ink changes, the pressure loss within the circulation path also changes. For example, in a case where the viscosity of ink becomes low, the amount of pressure loss within the circulation path also reduces. As a result of this, the flow rate of the circulation pump 1500 being driven with a predetermined driving amount increases and the flow rate of ink flowing through the ejection module 1300 increases. On the other hand, the ejection module 1300 is kept at a predetermined temperature by a temperature adjustment mechanism, not shown schematically, and therefore, the viscosity of the ink within the ejection module 1300 is kept constant even though the environmental temperature changes. In a case where the flow rate of the ink flowing within the ejection module 1300 increases while the viscosity of the ink within the ejection module 1300 does not change, the negative pressure in the ejection module 1300 becomes high accordingly due to the flow resistance. In a case where the negative pressure in the ejection module 1300 becomes higher than a predetermined value as described above, there is a concern that the meniscus of the ejection port 1013 is destroyed and the outside air is pulled into the circulation path, and therefore, it is no longer possible to perform normal ejection. Further, there is a concern that the negative pressure within the pressure chamber 1012 becomes higher than a predetermined value and the ejection is affected even though the meniscus is not destroyed.

Because of this, in the present embodiment, the bypass flow path 1160 is formed within the circulation path. By providing the bypass flow path 1160, in a case where the negative pressure becomes higher than a predetermined value, ink flows also into the bypass flow path 1160, and therefore, it is possible to keep the pressure within the ejection module 1300 constant. Consequently, for example, it may also be possible to configure the communication port 1191B in the second pressure adjustment unit 1150 with the control pressure that maintains the closed state even in a case where the circulation pump 1500 is being driven. Then, it may also be possible to set the control pressure in the second pressure adjustment unit 1150 so that the communication port 1191 in the second pressure adjustment unit 1150 enters the open state in a case where the negative pressure becomes higher than a predetermined value. That is, provided that the meniscus does not collapse or a predetermined negative pressure is maintained even though the flow rate of the pump changes due to the change in viscosity, such as the change in environment, the communication port 1191B may be in the closed state in a case where the circulation pump 1500 is being driven.

<Configuration of Ejection Unit>

Figure 20A:
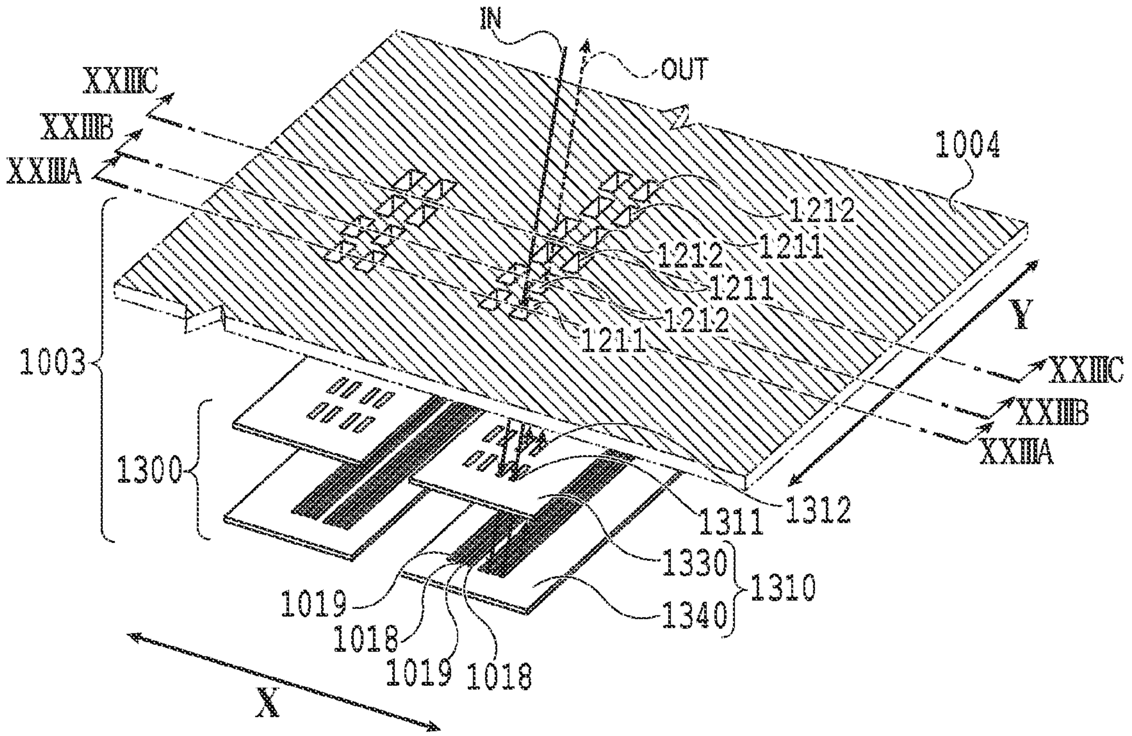
FIG. 20A is a schematic diagram showing a circulation path of ink of one color in an ejection unit.
Figure 20B:
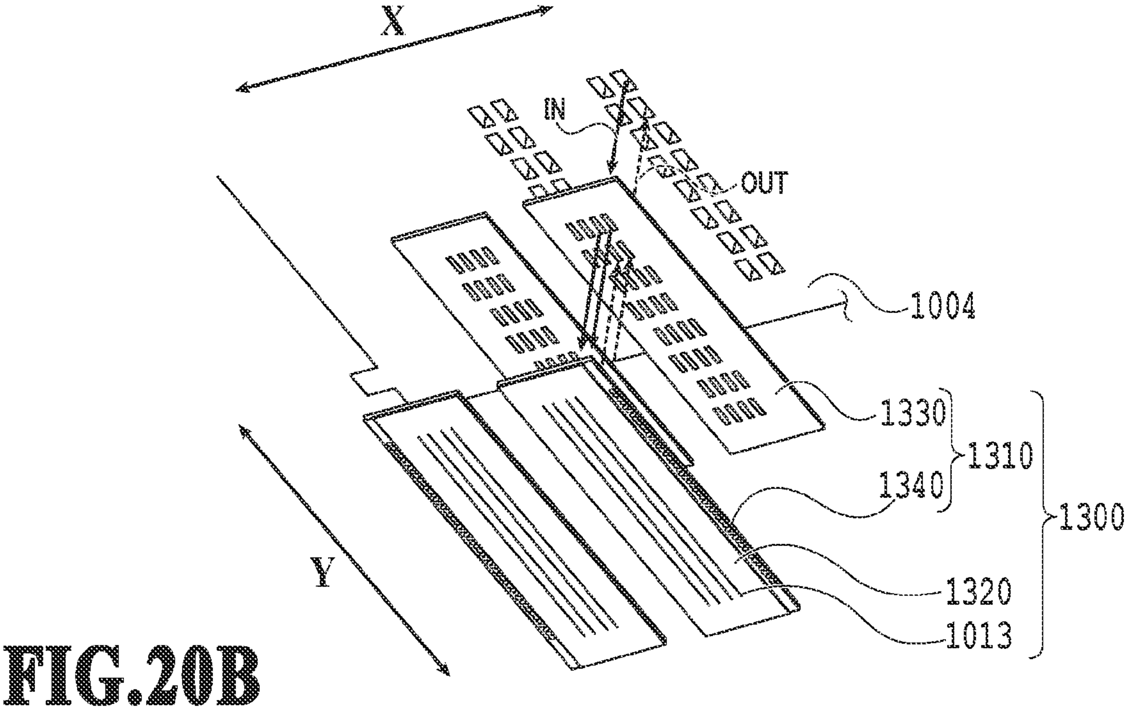
FIG. 20B is a schematic diagram showing the circulation path of ink of one color in the ejection unit.
Figure 21:
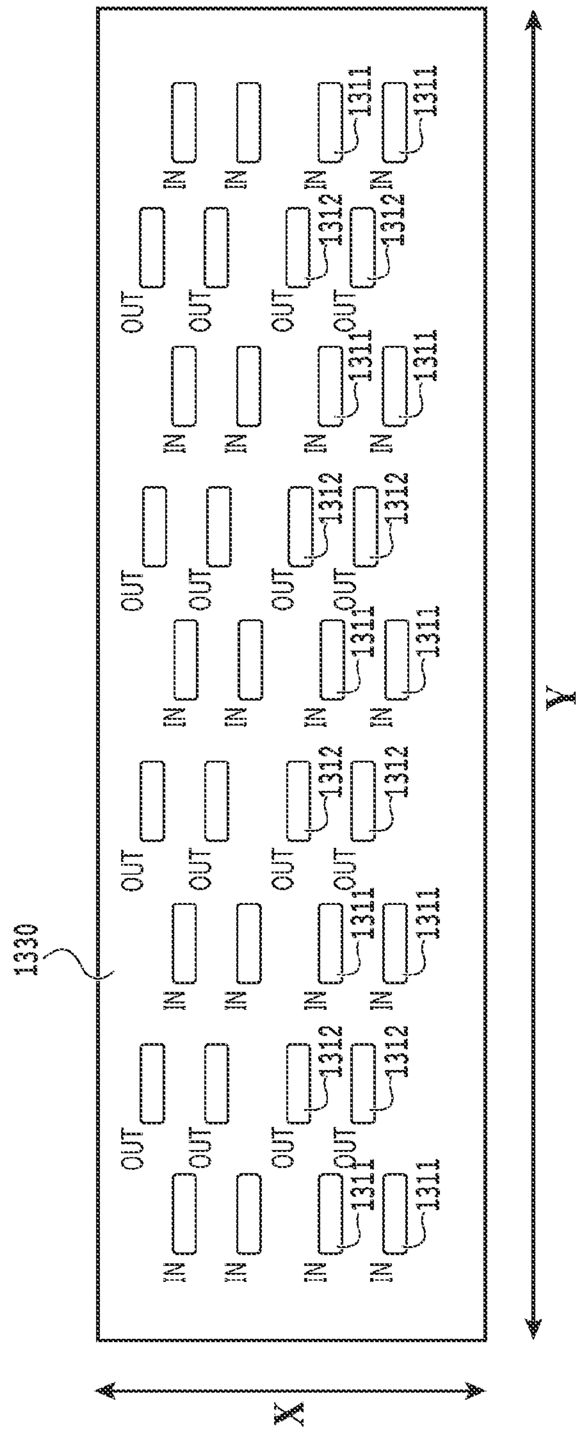
FIG. 21 is a diagram showing an opening plate.
Figure 22:
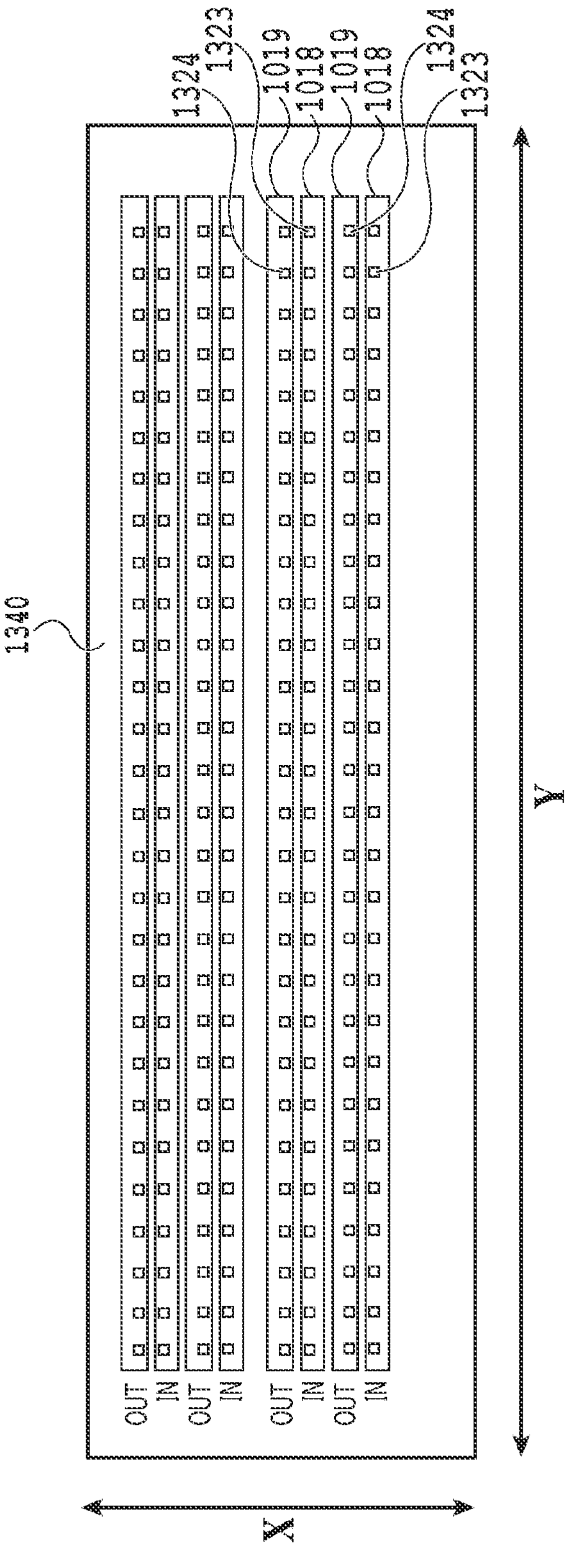
FIG. 22 is a diagram showing an ejection element substrate.

FIG. 20A and FIG. 20B are each a schematic diagram showing the circulation path of ink corresponding to one color in an ejection unit 1003 of the present embodiment. FIG. 20A is an exploded perspective diagram in a case where the ejection unit 1003 is viewed from the side of a first support member 1004 and FIG. 20B is an exploded perspective diagram in a case where the ejection unit 1003 is viewed from the side of the ejection module 1300. In FIG. 20A and FIG. 20B, arrows indicated by IN and OUT indicate the flow of ink and the flow of ink is explained for only one color, but the flow is the same for the other colors. Further, in FIG. 20A and FIG. 20B, the description of a second support member and an electrical wiring member is omitted and this is also the same with the explanation of the configuration of the following ejection unit. The ejection module 1300 comprises an ejection element substrate 1340 and an opening plate 1330. FIG. 21 is a diagram showing the opening plate 1330 and FIG. 22 is a diagram showing the ejection element substrate 1340.

To the ejection unit 1003, ink is supplied from the circulation unit 200 via a joint member, not shown schematically. The path of the ink after the ink passes through the joint member until the ink returns to the joint member is explained.

The ejection module 1300 comprises the ejection element substrate 1340, which is a silicon substrate 1310, and the opening plate 1330, and further comprises an ejection port forming member 1320. The ejection element substrate 1340, the opening plate 1330, and the ejection port forming member 1320 form the ejection module 1300 by each ink flow path overlapping and being joined so as to communicate with one another, and are supported by the first support member 1004. By the ejection module 1300 being supported by the first support member 1004, the ejection unit 1003 is formed. The ejection element substrate 1340 comprises the ejection port forming member 1320 and the ejection port forming member 1320 comprises a plurality of ejection port columns in which a plurality of the ejection ports 1013 forms columns and ejects part of the ink supplied via the ink flow path within the ejection module 1300 from the ejection port 1013. The ink that is not ejected is collected via the ink flow path within the ejection module 1300.

As shown in FIG. 20A, FIG. 20B, and FIG. 21, the opening plate 1330 comprises a plurality of arrayed ink supply ports 1311 and a plurality of arrayed ink collection ports 1312. As shown in FIG. 22 and FIG. 23A to FIG. 23C, the ejection element substrate 1340 comprises a plurality of arrayed supply connection flow paths 1323 and a plurality of arrayed collection connection flow paths 1324. Further, the ejection element substrate 1340 comprises a common supply flow path 1018 that communicates with a plurality of the supply connection flow paths 1323 and a common collection flow path 1019 that communicates with a plurality of the collection connection flow paths 1324. The ink flow path within the ejection unit 1003 is formed by causing an ink supply flow path 1048 and an ink collection flow path 1049 provided in the first support member 1004 to communicate with the flow path provided in the ejection module 1300. A support member supply port 1211 is a cross-sectional opening forming the ink supply flow path 1048 and a support member collection port 1212 is a cross-sectional opening forming the ink collection flow path 1049.

The ink that is supplied to the ejection unit 1003 is supplied from the side of the circulation unit 200 to the ink supply flow path 1048 of the first support member 1004. The ink having flowed via the support member supply port 1211 within the ink supply flow path 1048 is supplied to the common supply flow path 1018 of the ejection element substrate 1340 via the ink supply flow path 1048 and the ink supply port 1311 of the opening plate 1330 and enters the supply connection flow path 1323. Up to the supply connection flow path 1323 is the flow path on the supply side. After than, the ink flows to the collection connection flow path 1324 of the flow path on the collection side via the pressure chamber 1012 of the ejection port forming member 1320. Details of the flow of ink in the pressure chamber 1012 will be described later.

The ink having entered the collection connection flow path 1324 in the flow path on the collection side flows to the common collection flow path 1019. After that, the ink flows from the common collection flow path 1019 to the ink collection flow path 1049 of the first support member 1004 via the ink collection port 1312 of the opening plate 1330 and is collected by the circulation unit 200 via the support member collection port 1212.

The area in which the ink supply port 1311 and the ink collection port 1312 in the opening plate 1330 do not exist corresponds to the area for separating the support member supply port 1211 and the support member collection port 1212 in the first support member 1004. Further, in this area, the first support member 1004 also does not have an opening. The area such as this is used as an adhesion area in a case where the ejection module 1300 and the first support member 1004 are caused to adhere to each other.

In FIG. 21, in the opening plate 1330, a plurality of columns of a plurality of openings arrayed in the X-direction is provided in the Y-direction and the openings for supply (IN) and the openings for collection (OUT) are arrayed alternately in the Y-direction so that the openings for IN and the openings for OUT are shifted from each other by a half pitch in the X-direction. In FIG. 22, on the ejection element substrate 1340, the common supply flow path 1018 communicating with a plurality of the supply connection flow paths 1323 arrayed in the Y-direction and the common collection flow path 1019 communicating with a plurality of the collection connection flow paths 1324 arrayed in the Y-direction are arrayed alternately in the X-direction. The common supply flow path 1018 and the common collection flow path 1019 are each divided for each type of ink and further, the number of common supply flow paths 1018 to be arranged and the number of common collection flow paths 1019 to be arranged are determined in accordance with the number of ejection port columns of each color. Further, the supply connection flow path 1323 and the collection connection flow path 1324 are also arranged so that the number thereof corresponds to the number of ejection ports 1013. The arrangement is not necessarily required to be performed in a one-to-one manner and it may also be possible to arrange the one supply connection flow path 1323 and the one collection connection flow path 1324 so as to correspond to a plurality of the ejection ports 1013.

By the opening plate 1330 such as this and the ejection element substrate 1340 overlapping and being joined so that the flow path of each ink communicates with each other, the ejection module 1300 is formed and supported by the first support member 1004. Due to this, the ink flow path comprising the supply flow path and collection flow path as described above is formed.

Figure 23A:
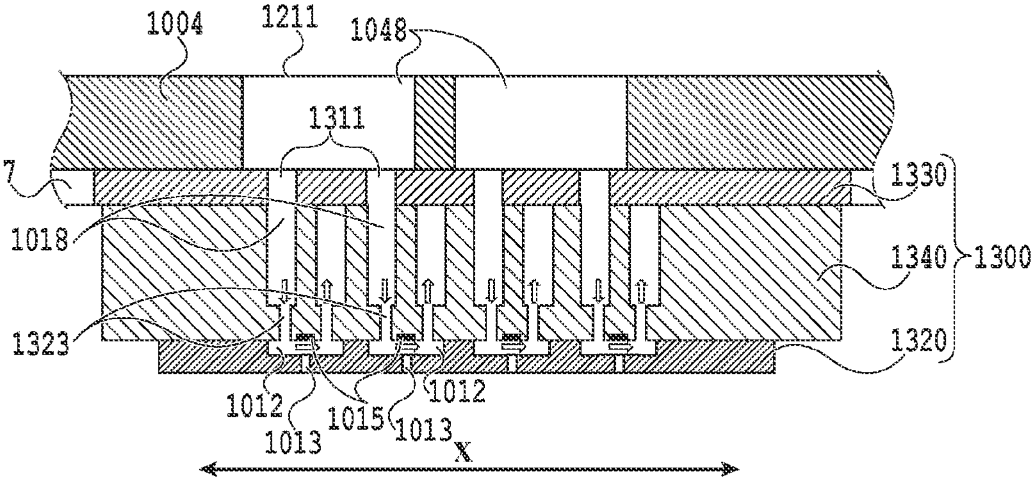
FIG. 23A is a cross-sectional diagram showing an ink flow in a different portion of the ejection unit.
Figure 23B:
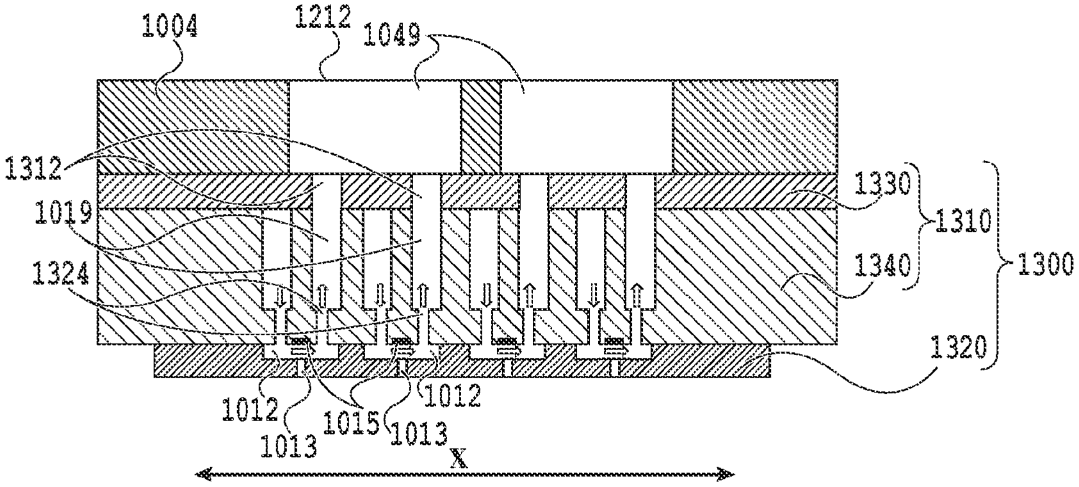
FIG. 23B is a cross-sectional diagram showing an ink flow in a different portion of the ejection unit.
Figure 23C:
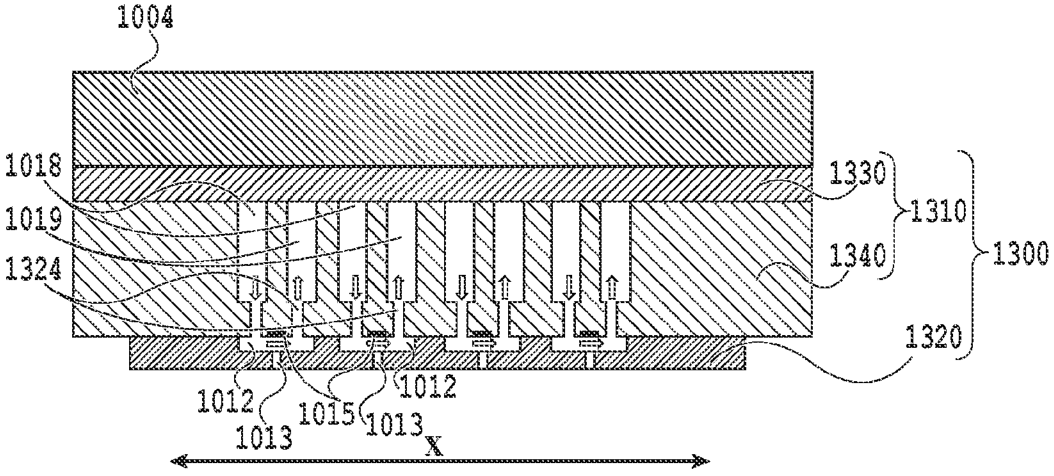
FIG. 23C is a cross-sectional diagram showing an ink flow in a different portion of the ejection unit.

FIG. 23A to FIG. 23C are each a cross-section diagram showing an ink flow in a different portion of the ejection unit 1003. FIG. 23A is a cross section indicated by XXIIIA-XXIIIA in FIG. 20A and shows the cross section of the portion in which the ink supply flow path 1048 and the ink supply port 1311 communicate with each other in the ejection unit 1003. Further, FIG. 23B is a cross section indicated by XXIIIB-XXIIIB in FIG. 20A and shows the cross section of the portion in which the ink collection flow path 1049 and the ink collection port 1312 communicate with each other in the ejection unit 1003. Furthermore, FIG. 23C is a cross section indicated by XXIIIC-XXIIIC in FIG. 20A and shows the cross section of the portion in which the ink supply port 1311 and the ink collection port 1312 do not communicate with the flow path of the first support member 1004.

In the supply flow path that supplies ink, as in FIG. 23A, ink is supplied from the portion in which the ink supply flow path 1048 of the first support member 1004 and the ink supply port 1311 of the opening plate 1330 overlap and communicate with each other. Further, in the collection flow path that collects ink, as in FIG. 23B, ink is collected from the portion in which the ink collection flow path 1049 of the first support member 1004 and the ink collection port 1312 of the opening plate 1330 overlap and communicate with each other. Furthermore, as show in FIG. 23C, in the ejection unit 1003, there is an area in which an opening is not provided in the opening plate 1330 partially. In the area such as that, ink is not supplied or collected between the ejection element substrate 1340 and the first support member 1004. Ink is supplied in the area in which the ink supply port 1311 is provided as in FIG. 23A and ink is collected in the area in which the ink collection port 1312 is provided as in FIG. 23B. In the present embodiment, the configuration using the opening plate 1330 is explained as an example, but an aspect that does not use the opening plate 1330 may be accepted. For example, a configuration may be accepted in which flow paths corresponding to the ink supply flow path 1048 and the ink collection flow path 1049 are formed on the first support member 1004 and the ejection element substrate 1340 is joined to the first support member 1004.

Figure 24A:
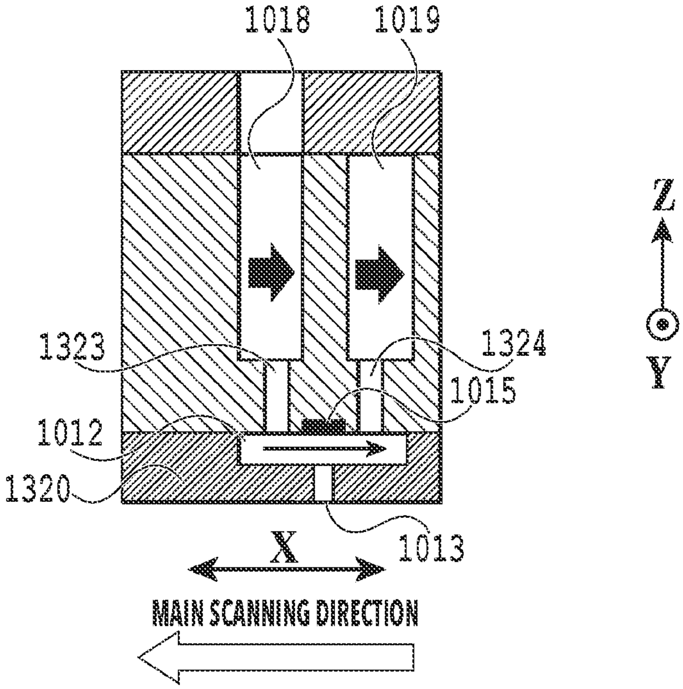
FIG. 24A is a cross-sectional diagram showing the vicinity of the ejection port in an ejection module.
Figure 24B:
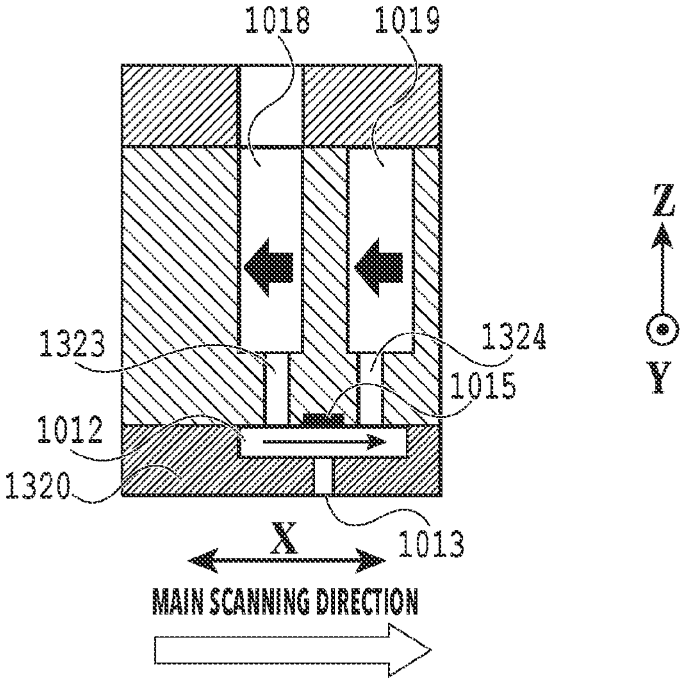
FIG. 24B is a cross-sectional diagram showing the vicinity of the ejection port in the ejection module.

FIG. 24A and FIG. 24B are each a cross-sectional diagram showing the vicinity of the ejection port 1013 in the ejection module 1300. Thick arrows shown within the common supply flow path 1018 and the common collection flow path 1019 in FIG. 24A and FIG. 24B indicate the swing of ink in the aspect that uses the liquid ejection apparatus 2000 of serial type. The ink supplied to the pressure chamber 1012 via the common supply flow path 1018 and the supply connection flow path 1323 is ejected from the ejection port 1013 by an ejection element 1015 being driven. In a case where the ejection element 1015 is not driven, the ink is collected to the common collection flow path 1019 from the pressure chamber 1012 via the collection connection flow path 1324, which is a collection flow path.

In a case where ejection of ink that circulates as above is performed in the aspect that uses the liquid ejection apparatus 2000 of serial type, the ejection of ink is affected not a little by the swing of ink within the ink flow path due to the main scan of the liquid ejection head 1000. Specifically, there is a case where the influence of the swing of ink within the ink flow path appears as a difference in the ejection amount of ink and a shift in the ejection direction.

Consequently, the configuration is designed so that both the common supply flow path 1018 and the common collection flow path 1019 of the present embodiment also extend in the Z-direction perpendicular to the X-direction, the main scanning direction, as well as extending in the Y-direction in across section shown in FIG. 24A and FIG. 24B. By designing the configuration such as this, it is possible to reduce the width in the main scanning direction of each flow path of the common supply flow path 1018 and the common collection flow path 1019. The width of each flow path in the main scanning direction of the common supply flow path 1018 and the common collection flow path 1019 is reduced. Due to this, the swing of ink is reduced, which is caused by the inertial force (thick black arrows in FIG. 24A and FIG. 24B) that is exerted in the direction opposite to the main scanning direction and which acts on the ink within the common supply flow path 1018 and the common collection flow path 1019 during the main scan. Due to this, it is possible to suppress the influence on the ink ejection by the swing of ink. Further, by causing the common supply flow path 1018 and the common collection flow path 1019 to extend in the Z-direction, the cross-sectional area is increased and the flow path pressure loss is reduced.

As described above, the configuration is such that the swing of ink within the common supply flow path 1018 and the common collection flow path 1019 at the time of the main scan is reduced by reducing the width of each flow path in the main scanning direction of the common supply flow path 1018 and the common collection flow path 1019, but this does not mean that the swing is eliminated completely. Consequently, in the present embodiment, the configuration is designed so that the common supply flow path 1018 and the common collection flow path 1019 are arranged at the position at which they overlap in the X-direction in order to suppress a difference in ejection from occurring for each type of ink, which may still occur by the reduced swing.

As described previously, in the present embodiment, the supply connection flow path 1323 and the collection connection flow path 1324 are provided so as to correspond to the ejection port 1013 and the correspondence relationship is such that the supply connection flow path 1323 and the collection connection flow path 1324 are arranged side by side in the X-direction with the ejection port 1013 being sandwiched in between. Because of this, there is a portion at which the common supply flow path 1018 and the common collection flow path 1019 do not overlap in the X-direction and in a case where the correspondence relationship between the supply connection flow path 1323 and the collection connection flow path 1324 in the X-direction breaks down, the ink flow and ejection in the X-direction in the pressure chamber 1012 are affected. In a case where the influence of the swing of ink is added further, there is a concern that the ink ejection of each ejection port is further affected.

Because of this, the common supply flow path 1018 and the common collection flow path 1019 are arranged at the position at which they overlap in the X-direction. Due to this, at any position in the Y-direction at which the ejection port 1013 is arrayed, the degree of the ink swing in the common supply flow path 1018 and that in the common collection flow path 1019 are substantially equal. As a result of that, the pressure difference between the side of the common supply flow path 1018 and the side of the common collection flow path 1019, which occurs within the pressure chamber 1012, does not vary considerably, and therefore, it is possible to perform stable ejection.

Further, in some liquid ejection heads that circulate ink, the flow path that supplies ink to the liquid ejection head and the flow path that collects ink are configured by the same flow path, but in the present embodiment, the common supply flow path 1018 and the common collection flow path 1019 are separate flow paths. Then, the supply connection flow path 1323 and the pressure chamber 1012 communicate with each other and the pressure chamber 1012 and the collection connection flow path 1324 communicate with each other and ink is ejected from the ejection port 1013 of the pressure chamber 1012. That is, the configuration is such that the pressure chamber 1012 connecting the supply connection flow path 1323 and the collection connection flow path 1324 comprises the ejection port 1013. Because of this, the ink flow from the side of the supply connection flow path 1323 to the side of the collection connection flow path 1324 occurs in the pressure chamber 1012, and therefore, the ink within the pressure chamber 1012 is circulated efficiently. By the ink within the pressure chamber 1012 being circulated efficiently, it is possible to keep fresh the ink within the pressure chamber 1012, which is susceptible to evaporation of ink from the ejection port 1013.

Further, by the two flow paths of the common supply flow path 1018 and the common collection flow path 1019 communicating with the pressure chamber 1012, in a case where it is necessary to perform ejection at a high flow rate, it is also made possible to supply ink from both the flow paths. That is, compared to the configuration in which the supply and collection of ink are performed by only one flow path, the configuration in the present embodiment has a merit that it is possible to deal with ejection at a high flow rate not only that it is possible to perform circulation efficiently.

Further, in a case where the common supply flow path 1018 and the common collection flow path 1019 are arranged at positions close to each other in the X-direction, the influence of the ink swing is made harder to occur. It is desirable for the flow paths to be configured so that the distance therebetween is 75 μm to 100 μm.

Figure 25:
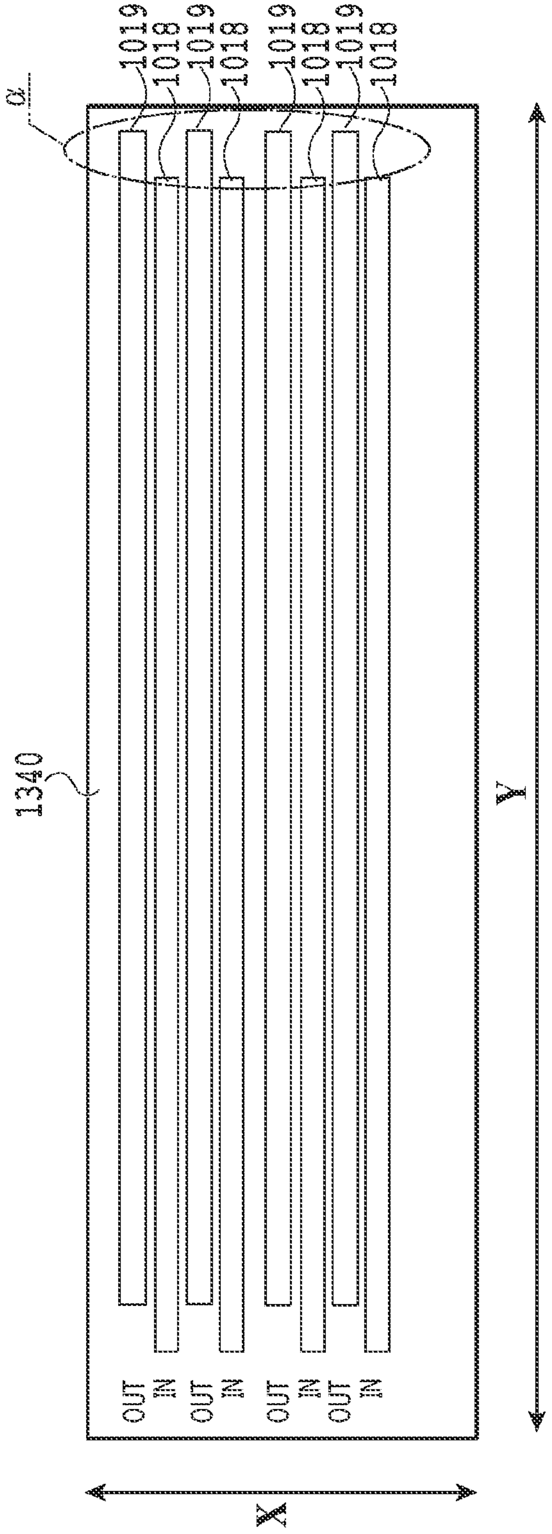
FIG. 25 is a diagram showing an ejection element substrate as a comparative example.

FIG. 25 is a diagram showing the ejection element substrate 1340 as a comparative example. In FIG. 25, the description of the supply connection flow path 1323 and the collection connection flow path 1324 is omitted. Into the common collection flow path 1019, the ink having received thermal energy by the ejection element 1015 in the pressure chamber 1012 flows, and therefore, the ink flows, whose temperature is comparatively higher than the temperature of the ink within the common supply flow path 1018. At this time, in the comparative example, as an a portion enclosed by a one-dot chain line in FIG. 25, there is a portion at which only the common collection flow paths 1019 exist in a portion in the X-direction of the ejection element substrate 1340. In this case, the temperature rises locally at this portion and temperature unevenness occurs within the ejection module 1300, and therefore, there is a possibility that ejection is affected.

Through the common supply flow path 1018, ink whose temperature is comparatively low compared to the common collection flow path 1019 flows. Because of this, in a case where the common supply flow path 1018 and the common collection flow path 1019 are adjacent to each other, part of the temperature is offset between the common supply flow path 1018 and the common collection flow path 1019 in the vicinity thereof, and therefore, a rise in temperature is suppressed. Consequently, it is preferable for the common supply flow path 1018 and the common collection flow path 1019 to have substantially the same length, exist at positions at which they overlap, and be adjacent to each other.

Figure 26A:
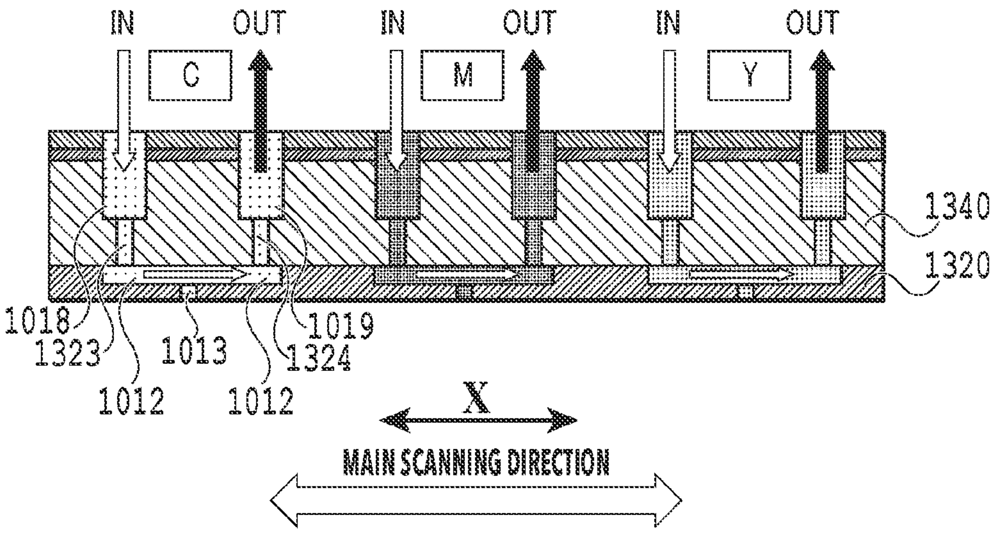
FIG. 26A is a diagram showing a flow path configuration of a liquid ejection head compatible with inks of three colors.
Figure 26B:
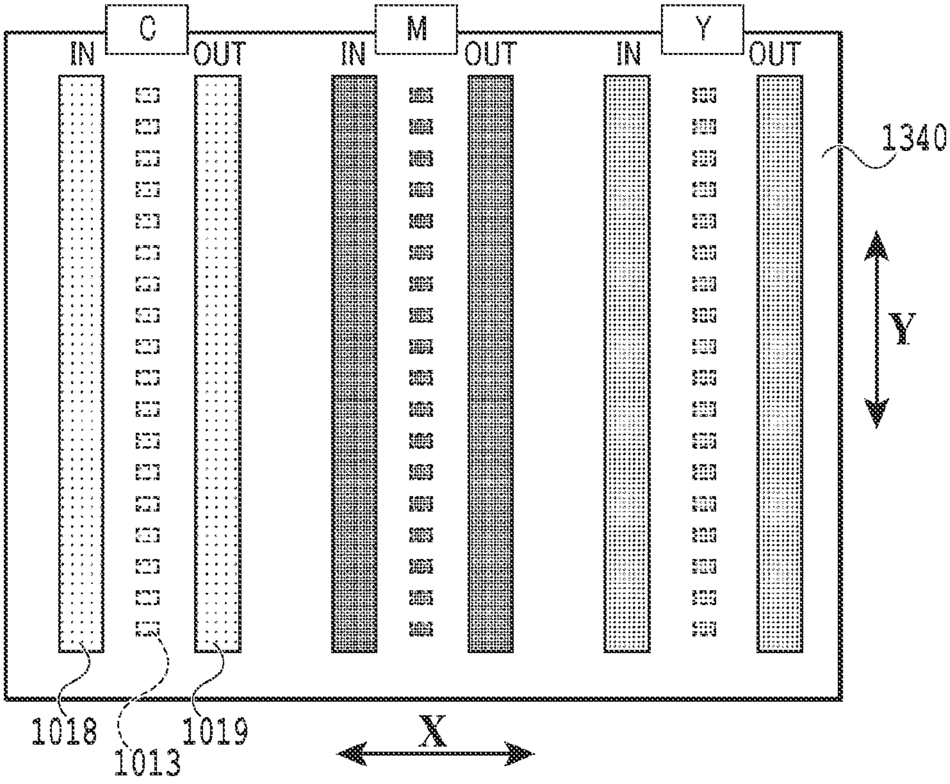
FIG. 26B is a diagram showing the flow path configuration of the liquid ejection head compatible with inks of three colors.

FIG. 26A and FIG. 26B are each a diagram showing the flow path configuration of the liquid ejection head 1000 compatible with inks of three colors of cyan (C), magenta (M), and yellow (Y). In the liquid ejection head 1000, as in FIG. 26A, a circulation flow path is provided for each type of ink. The pressure chamber 1012 is provided along the X-direction, the main scanning direction, of the liquid ejection head 1000. Further, as in FIG. 26B, the common supply flow path 1018 and the common collection flow path 1019 are provided along the ejection port column in which the ejection ports 1013 are arrayed and the common supply flow path 1018 and the common collection flow path 1019 are provided extending in the Y-direction so as to sandwich the ejection port column.

<Connection Between Main Body and the Liquid Ejection Head>

Figure 27:
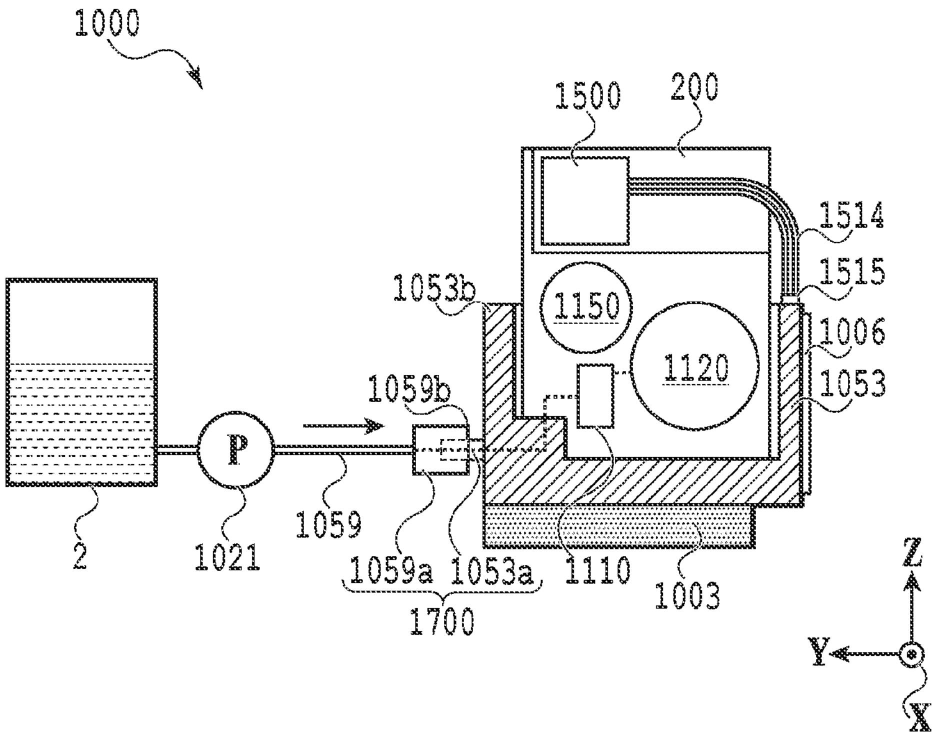
FIG. 27 is a diagram showing a connection state of an ink tank, an external pump, and the liquid ejection head.

FIG. 27 is a schematic configuration diagram showing in detail the ink tank provided in the main body of the liquid ejection apparatus 2000 of the present embodiment, the connection state between the external pump 1021 and the liquid ejection head 1000, and the arrangement of the circulation pump and the like. The liquid ejection apparatus 2000 in the present embodiment has the configuration in which it is possible to simply exchange only the liquid ejection head 1000 with another in a case where a problem occurs in the liquid ejection head 1000. Specifically, the liquid ejection apparatus 2000 has a liquid connection portion 1700 that may enable simple connection and disconnection between an ink supply tube 1059 connected to the external pump 1021 and the liquid ejection head 1000. Due to this, it is made possible to simply attach and detach only the liquid ejection head 1000 to and from the liquid ejection apparatus 2000.

As shown in FIG. 27, the liquid connection portion 1700 has a liquid connector insertion port 1053*a* provided so as to protrude from a head casing 1053 of the liquid ejection head 1000 and a cylindrical liquid connector 1059*a* into which the liquid connector insertion port 1053*a* can be inserted. The liquid connector insertion port 1053*a* is connected fluidly to the ink supply flow path formed within the liquid ejection head 1000 and connected to the first pressure adjustment unit 1120 via the filter 1110 described previously. Further, the liquid connector 1059*a* is provided at the tip of the ink supply tube 1059 connected to the external pump 1021 that supplies the ink of the ink tank 2 under pressure to the liquid ejection head 1000

As described above, due to the liquid connection portion 1700, it is made possible to easily perform attachment/detachment and exchange work of the liquid ejection head 1000 shown in FIG. 27. However, in a case where the sealing properties of the liquid connector insertion port 1053*a* and the liquid connector 1059*a* deteriorate, there is a concern that the ink supplied under pressure by the external pump 1021 leaks from the liquid connection portion 1700. In a case where the ink having leaked sticks to the circulation pump 1500 and the like, there is a possibility that a problem occurs in the electrical system. Consequently, in the present embodiment, the circulation pump and the like are arranged as follows.

<Arrangement of Circulation Pump and the Like>

As shown in FIG. 27, in the present embodiment, in order to avoid the ink having leaked from the liquid connection portion 1700 from sticking to the circulation pump 1500, the circulation pump 1500 is arranged above the liquid connection portion 1700 in the gravitational upward direction. That is, the circulation pump 1500 is arranged above the liquid connector insertion port 1053*a*, which is the introduction port of liquid of the liquid ejection head 1000, in the gravitational upward direction. Further, the circulation pump 1500 is arranged at a position at which the circulation pump 1500 does not come into contact with the member configuring the liquid connection portion 1700. Due to this, even in a case where ink leaks from the liquid connection portion 1700, the ink flows in the horizontal direction, which is the direction in which the liquid connector 1059*a* opens, or in the gravitational downward direction, and therefore, it is possible to suppress the ink from reaching the circulation pump 1500 located in the gravitational upward direction. Further, the circulation pump 1500 is arranged at a position distant from the liquid connection portion 1700, and therefore, the possibility that the ink reaches the circulation pump 1500 through the member is also reduced.

Further, an electrical connection portion 1515 that electrically connects the circulation pump 1500 and an electrical contact substrate 1006 via a flexible wiring member 1514 is provided in the gravitational upward direction. Because of this, it is possible to reduce the possibility that an electrical problem due to the ink from the liquid connection portion 1700 occurs.

Further, in the present embodiment, a wall portion 1052*b* of the head casing 1053 is provided, and therefore, even in a case where ink erupts from an opening 1059*b* of the liquid connection portion 1700, it is possible to shut off the ink and reduce the possibility that the ink reaches the circulation pump 1500 and the electrical connection portion 1515.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081586 filed May 18, 2022, which is hereby incorporated by reference herein in its entirety.

What is claimed is:

1. A liquid ejection head comprising:

a printing element substrate having a pressure chamber in which ejection ports are formed and for ejecting liquid from the ejection ports;

a first supply flow path provided on the printing element substrate and communicating with the pressure chamber;

a first collection flow path provided on the printing element substrate and communicating with the pressure chamber;

a circulation pump causing a pressure difference to occur between the first supply flow path and the first collection flow path so that liquid is supplied from the first supply flow path to the pressure chamber and liquid of the pressure chamber is collected from the first collection flow path; and a second supply flow path connecting the first supply flow path and the circulation pump, wherein the second supply flow path has a vertical cross-sectional area in a liquid circulation direction, which is double or more a vertical cross-sectional area in a liquid circulation direction in the first supply flow path and has a flow path inner wall inclined with respect to the gravitational direction and whose component force of a normal vector has a component in the gravitational direction.

2. The liquid ejection head according to claim 1, further comprising:

a second collection flow path connecting the first collection flow path and the circulation pump, wherein the second collection flow path has a vertical cross-sectional area in a liquid circulation direction, which is double or more a vertical cross-sectional area in a liquid circulation direction in the first collection flow path and has s flow path inner wall inclined with respect to the gravitational direction and whose component force of a normal vector has a component in the gravitational direction.

3. The liquid ejection head according to claim 1, wherein the printing element substrate has a plurality of the pressure chambers, and the second supply flow path has a vertical cross-sectional area in a liquid circulation direction, which is double or more a total area of vertical cross-sectional areas in a liquid circulation direction in a plurality of the first supply flow paths.

4. The liquid ejection head according to claim 2, wherein the printing element substrate has a plurality of the pressure chambers, and the second collection flow path has a vertical cross-sectional area in a liquid circulation direction, which is double or more a total area of vertical cross-sectional areas in a liquid circulation direction in a plurality of the first collection flow paths.

5. The liquid ejection head according to claim 1, wherein the second supply flow path is provided with an air bubble reservoir portion having a vertical cross-sectional area in a liquid circulation direction, which is double or more a minimum vertical cross-sectional area in a liquid circulation direction in the second supply flow path and a flow path inner wall inclined with respect to the gravitational direction and whose component force of a normal vector has a component in the gravitational direction.

6. The liquid ejection head according to claim 2, wherein the second collection flow path is provided with an air bubble reservoir portion having a vertical cross-sectional area in a liquid circulation direction, which is double or more a minimum vertical cross-sectional area in a liquid circulation direction in the second collection flow path and a flow path inner wall inclined with respect to the gravitational direction and whose component force of a normal vector has a component in the gravitational direction.

7. The liquid ejection head according to claim 1, wherein an angle formed by the normal vector of the inclined flow path inner wall in the second supply flow path and a gravitational direction vector is greater than or equal to 15 degrees.

8. The liquid ejection head according to claim 2, wherein an angle formed by the normal vector of the inclined flow path inner wall in the second collection flow path and a gravitational direction vector is greater than or equal to 15 degrees.

9. The liquid ejection head according to claim 2, further comprising:

an ejection port column in which a plurality of the ejection ports is arrayed, wherein the second supply flow path has a first connection portion that is branched into two or more portions and connected to the first supply flow path, the second collection flow path has a second connection portion that is branched into one or more portions and connected to the first collection flow path, and the first connection portion and the second connection portion are arrayed alternately along the ejection port column.

10. A liquid ejection head comprising:

a printing element substrate having a pressure chamber in which ejection ports are formed and for ejecting liquid from the ejection ports;

a first supply flow path provided on the printing element substrate and communicating with the pressure chamber;

a first collection flow path provided on the printing element substrate and communicating with the pressure chamber;

a circulation pump causing a pressure difference to occur between the first supply flow path and the first collection flow path so that liquid is supplied from the first supply flow path to the pressure chamber and liquid of the pressure chamber is collected from the first collection flow path; and a second collection flow path connecting the first collection flow path and the circulation pump, wherein the second collection flow path has a vertical cross-sectional area in a liquid circulation direction, which is double or more a vertical cross-sectional area in a liquid circulation direction in the first collection flow path and has a flow path inner wall inclined with respect to the gravitational direction and whose component force of a normal vector has a component in the gravitational direction.

11. A liquid ejection head comprising:

a printing element substrate having a pressure chamber in which ejection ports are formed and for ejecting liquid from the ejection ports;

a first supply flow path provided on the printing element substrate and communicating with the pressure chamber;

a first collection flow path provided on the printing element substrate and communicating with the pressure chamber;

a circulation pump causing a pressure difference to occur between the first supply flow path and the first collection flow path so that liquid is supplied from the first supply flow path to the pressure chamber and liquid of the pressure chamber is collected from the first collection flow path; and a second supply flow path connecting the first supply flow path and the circulation pump, wherein the second supply flow path is provided with an air bubble reservoir portion having a vertical cross-sectional area in a liquid circulation direction, which is double or more a minimum vertical cross-sectional area in a liquid circulation direction in the second supply flow path and a flow path inner wall inclined with respect to the gravitational direction and whose component force of a normal vector has a component in the gravitational direction.

12. A liquid ejection head comprising:

a printing element substrate having a pressure chamber in which ejection ports are formed and for ejecting liquid from the ejection ports;

a first supply flow path provided on the printing element substrate and communicating with the pressure chamber;

a first collection flow path provided on the printing element substrate and communicating with the pressure chamber;

a circulation pump causing a pressure difference to occur between the first supply flow path and the first collection flow path so that liquid is supplied from the first supply flow path to the pressure chamber and liquid of the pressure chamber is collected from the first collection flow path; and a second collection flow path connecting the first collection flow path and the circulation pump, wherein the second collection flow path is provided with an air bubble reservoir portion having a vertical cross-sectional area in a liquid circulation direction, which is double or more a minimum vertical cross-sectional area in a liquid circulation direction in the second collection flow path and a flow path inner wall inclined with respect to the gravitational direction and whose component force of a normal vector has a component in the gravitational direction.

13. A liquid ejection apparatus on which a liquid ejection head can be mounted, comprising:

a printing element substrate having a pressure chamber in which ejection ports are formed and for ejecting liquid from the ejection ports;

a first supply flow path provided on the printing element substrate and communicating with the pressure chamber;

a first collection flow path provided on the printing element substrate and communicating with the pressure chamber;

a circulation pump causing a pressure difference to occur between the first supply flow path and the first collection flow path so that liquid is supplied from the first supply flow path to the pressure chamber and liquid of the pressure chamber is collected from the first collection flow path; and a second supply flow path connecting the first supply flow path and the circulation pump, wherein the second supply flow path has a vertical cross-sectional area in a liquid circulation direction, which is double or more a vertical cross-sectional area in a liquid circulation direction in the first supply flow path and has a flow path inner wall inclined with respect to the gravitational direction and whose component force of a normal vector has a component in the gravitational direction.

* * * * *